(12) United States Patent
Toyoda et al.

(10) Patent No.: US 8,213,736 B2
(45) Date of Patent: Jul. 3, 2012

(54) IMAGE PROCESSING DEVICE AND IMAGE PROCESSING METHOD

(75) Inventors: Yuushi Toyoda, Kawasaki (JP); Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 752 days.

(21) Appl. No.: 12/379,253

(22) Filed: Feb. 17, 2009

(65) Prior Publication Data
US 2009/0185756 A1 Jul. 23, 2009

Related U.S. Application Data

(63) Continuation of application No. PCT/JP2006/316540, filed on Aug. 17, 2006.

(51) Int. Cl.
*G06K 9/42* (2006.01)
*G06K 9/40* (2006.01)

(52) U.S. Cl. .................................. 382/264; 382/254

(58) Field of Classification Search .......... 382/254–275, 382/298
See application file for complete search history.

(56) References Cited

U.S. PATENT DOCUMENTS

| | | | | |
|---|---|---|---|---|
| 5,799,112 A | * | 8/1998 | de Queiroz et al. | 382/254 |
| 6,226,414 B1 | * | 5/2001 | Go | 382/240 |
| 2004/0190023 A1 | | 9/2004 | Aoyama | |

FOREIGN PATENT DOCUMENTS

| | | |
|---|---|---|
| EP | 0 813 336 A2 | 12/1997 |
| JP | 2000-105815 | 4/2000 |
| JP | 2001-275015 | 10/2001 |
| JP | 2003-8935 | 1/2003 |
| JP | 2004-172726 | 6/2004 |
| WO | 01/74056 A1 | 10/2001 |

OTHER PUBLICATIONS

International Search Report for corresponding international application PCT/JP2006/316540, mailed Nov. 21, 2006.
European Search Report dated Apr. 26, 2010 and issued in corresponding European Patent Application 06796703.4.

* cited by examiner

*Primary Examiner* — Alex Liew
(74) *Attorney, Agent, or Firm* — Fujitsu Patent Center

(57) ABSTRACT

An image processing device is for generating a smoothed image with an input image blurred. The device includes first low pass filters each set with a different range of level value, using each pixel in the input image or a first input image generated based on the input image as a pixel of interest, extracting each pixel that has a level value of each pixel in a filter size within a range of level value, and generating a first level value limit smoothed image by smoothing a level value of an extracted pixel to be used as a level value of the pixel of interest. The device also includes a first synthesis processing unit that uses each pixel in the input image or a second input image generated based on the input image as a processing object pixel.

15 Claims, 19 Drawing Sheets

IMAGE PROCESSING DEVICE AND IMAGE PROCESSING METHOD

CROSS-REFERENCE TO RELATED APPLICATION(S)

This application is a continuation of PCT international application Ser. No. PCT/JP2006/316540 filed on Aug. 17, 2006 which designates the United States, the entire contents of which are incorporated herein by reference.

FIELD

The embodiments discussed herein are directed to image processing for generating a smoothed image by applying a low pass filter to pixels.

BACKGROUND

In digital image processing, a smoothed image with a blurred image is generated by using a low pass filter, and an average value of level values of pixels in a filter size is used as a signal level of a pixel of interest. However, when the low pass filter is used, because the average value of the level values of the pixels in the filter size is used as the level value of the pixel of interest, a problem occurs in that an edge portion having a large difference in level values is also blurred. More specifically, when the low pass filter is used, as depicted in FIG. 17, a gradient of an edge portion of an image to be processed having a large contrast depicted by a solid line, is smoothed in a low pass filter image (LPF image in the diagram) output from the low pass filter depicted by a dotted line. Accordingly, the edge portion cannot be maintained.

To improve such a problem, various technologies have been developed to accurately maintain the edge portion of an image and to blur the portion other than the edge. For example, Japanese Laid-open Patent Publication No. 2000-105815 discloses a technology that relates to a face image processing device (image processing device) using an epsilon filter.

More specifically, as depicted in FIG. 18, a pixel positioned at coordinates (m, n) of an image is regarded as a pixel of interest, and pixels at the periphery of the pixel of interest (in this case, eight pixels at coordinates (m−1, n−1), coordinates (m, n−1), coordinates (m+1, n−1), coordinates (m−1, n), coordinates (m+1, n), coordinates (m−1, n+1), coordinates (m, n+1), and coordinates (m+1, n+1)) are regarded as peripheral pixels. A differential detector 500 calculates the difference between a level value of the pixel of interest (such as a gray scale value of a luminance signal) and a level value of each peripheral pixel, and a threshold determining unit 501 extracts a peripheral pixel whose difference calculated by the differential detector 500 is smaller than a predetermined threshold TH. An adder 503 then adds a pixel value of the pixel of interest with a pixel value obtained by multiplying a predetermined coefficient to a signal level of the peripheral pixel extracted by the threshold determining unit 501, and outputs the resultant value as a pixel value of the pixel of interest.

In this manner, in the conventional technology disclosed in Japanese Laid-open Patent Publication No. 2000-105815, the level width of the gray scale value is limited, by simply processing the peripheral pixels whose difference with the level value of the pixel of interest is smaller than the threshold TH. Accordingly, as depicted in FIG. 19, the gradient of the edge portion of an epsilon filter image ($\epsilon$ filter image in the diagram) output from the epsilon filter depicted by the dotted line is not smoothed, but maintaining the gradient of the edge portion of the image to be processed depicted by the solid line. Thus, the edge portion is accurately maintained and the portion other the edge is blurred.

However, in the conventional technology using the epsilon filter disclosed in Japanese Laid-open Patent Publication No. 2000-105815, each pixel in the image is used as a pixel of interest, and the difference between the level value of the pixel of interest and the level value of each peripheral pixel need to be calculated and compared with the threshold. Accordingly, a conditional branch process using variables is to be included, thereby creating problems such as a heavy processing load and difficulty in increasing speed.

To reduce the processing load and to increase the speed, a smoothing process using an epsilon filter may be performed on a reduced image (the number of pixel of interest and peripheral pixels is reduced by taking out pixels in the image), and the image to which the smoothing process is performed may then be enlarged. In other words, the speed can be increased by carrying out the process by lowering the resolution of (discretizing) an image. However, when the image is reduced, depending on the position of the edge, the pixels at the edge portion may be taken out, thereby generating a reduced image not including edge information. Accordingly, in the conventional technology using the epsilon filter disclosed in Japanese Laid-open Patent Publication No. 2000-105815, in which a pixel value of the pixel of interest is obtained by adding the pixel value of the pixel of interest with the pixel values of the peripheral pixels to be processed, as depicted in FIG. 20, the gradient at the edge portion of the image to be processed depicted by the solid line may not be maintained by the output from the epsilon filter, generated by a discrete process depicted by the dotted line. In other words, in the conventional technology using the epsilon filter disclosed in Japanese Laid-open Patent Publication No. 2000-105815, when the resolution of the image is lowered to reduce the processing load and to increase the speed thereof, a problem occurs in that the edge portion cannot be accurately maintained.

To reduce the processing load and to increase the speed thereof, there is a method (sequential process) that breaks a two-dimensional filter into a one-dimensional filter used to process an image in the horizontal direction and a one-dimensional filter used to process the image in the vertical direction, and carries out the smoothing process in the vertical direction, after carrying out the smoothing process in the horizontal direction. However, when the sequential process is applied to the convention technology using the epsilon filter disclosed in Japanese Laid-open Patent Publication No. 2000-105815, the one-dimensional filter in the vertical direction (vertical filter) is applied to an output image of the one-dimensional filter in the horizontal direction (horizontal filter). Accordingly, a vertical outline may be generated.

With reference to FIG. 21, the generation of the vertical outline will be described. In an input image 600, the difference between a level value (gray scale value) of each pixel positioned in a region 602 and a gray scale value of each pixel positioned in a region 603 is large, the difference between a level value (gray scale value) of each pixel positioned in a region 601 and a gray scale value of each pixel positioned in the region 602 adjacent to the region 601 is equal to or more than the limited level width (equal to or more than threshold TH), and the difference between the gray scale value of each pixel positioned in the region 601 and the gray scale value of each pixel positioned in the region 603 adjacent to and below the region 601 in the vertical direction is less than the limited level width.

When the one-dimensional filter used for processing in the horizontal direction is applied to the input image 600, the difference between the gray scale value of each pixel positioned in the region 601 and the gray scale value of each pixel positioned in the region 602 becomes equal to or more than the threshold TH. Accordingly, when a pixel positioned in the region 601 is used as a pixel of interest, the pixels positioned in the region 602 will not be processed. When a pixel positioned in the region 602 is used as a pixel of interest, the pixels positioned in the region 601 will not be processed. Therefore, in a horizontal filter output image 600a in which a horizontal filter is applied to the input image 600, a region 601a that corresponds to the region 601 in the input image 600 and a region 602a that corresponds to the region 602 in the input image 600 are not blurred.

Next, a vertical filter is applied to the horizontal filter output image 600a. The difference between a gray scale value of each pixel positioned in the region 601 and a gray scale value of each pixel positioned in the region 603 of the input image 600 is less than the threshold TH. Accordingly, the difference between a gray scale value of each pixel positioned in the region 601a of the horizontal filter output image 600a that corresponds to the region 601 of the input image 600, and a gray scale value of each pixel positioned in the region 603a of the horizontal filter output image 600a that corresponds to the region 603 of the input image 600 also becomes less than the threshold TH. Therefore, when a pixel in the region 601a of the horizontal filter output image 600a is used as a pixel of interest, the pixels positioned in the region 603a are to be processed. When a pixel in the region 603a of the horizontal filter output image 600a is used as a pixel of interest, the pixels positioned in the region 601a are to be processed. Accordingly, a vertical filter output image 600b in which a vertical filter is applied to the horizontal filter output image 600a is blurred in the vertical direction (regions 601b and 603b that correspond to the regions 601 and 603 of the input image 600). However, a vertical outline is generated at a boundary between the regions 601b and 602a that correspond to the regions 601 and 602 of the input image 600, where the horizontal filter could not blur.

In this manner, in the conventional technology using the epsilon filter disclosed in Japanese Laid-open Patent Publication No. 2000-105815, when the processing load is reduced and the speed is increased by lowering the resolution of the image and by performing sequential process, a problem occurs in that the edge cannot be maintained accurately.

SUMMARY

According to an aspect of the invention, an image processing device for generating a smoothed image with an input image blurred includes a plurality of first low pass filters each set with a different range of level value, using each pixel in the input image or a first input image generated based on the input image as a pixel of interest, extracting each pixel that has a level value of each pixel including the pixel of interest in a filter size within a range of level value set therein, and generating a first level value limit smoothed image by smoothing a level value of an extracted pixel to be used as a level value of the pixel of interest; and a first synthesis processing unit that uses each pixel in the input image or a second input image generated based on the input image as a processing object pixel, selects one or a plurality of first level value limit smoothed images generated by the first low pass filter set with a range of level value including a level value of the processing object pixel, and generates a smoothed image that uses a value calculated from a level value of one or a plurality of pixels at a position of the processing object pixel or in a vicinity thereof in the first level value limit smoothed image selected, as the level value of the processing object pixel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Preferred embodiments of the present invention will be explained with reference to accompanying drawings. The present invention is not limited to the embodiments.

[a] First Embodiment

Figure 1:
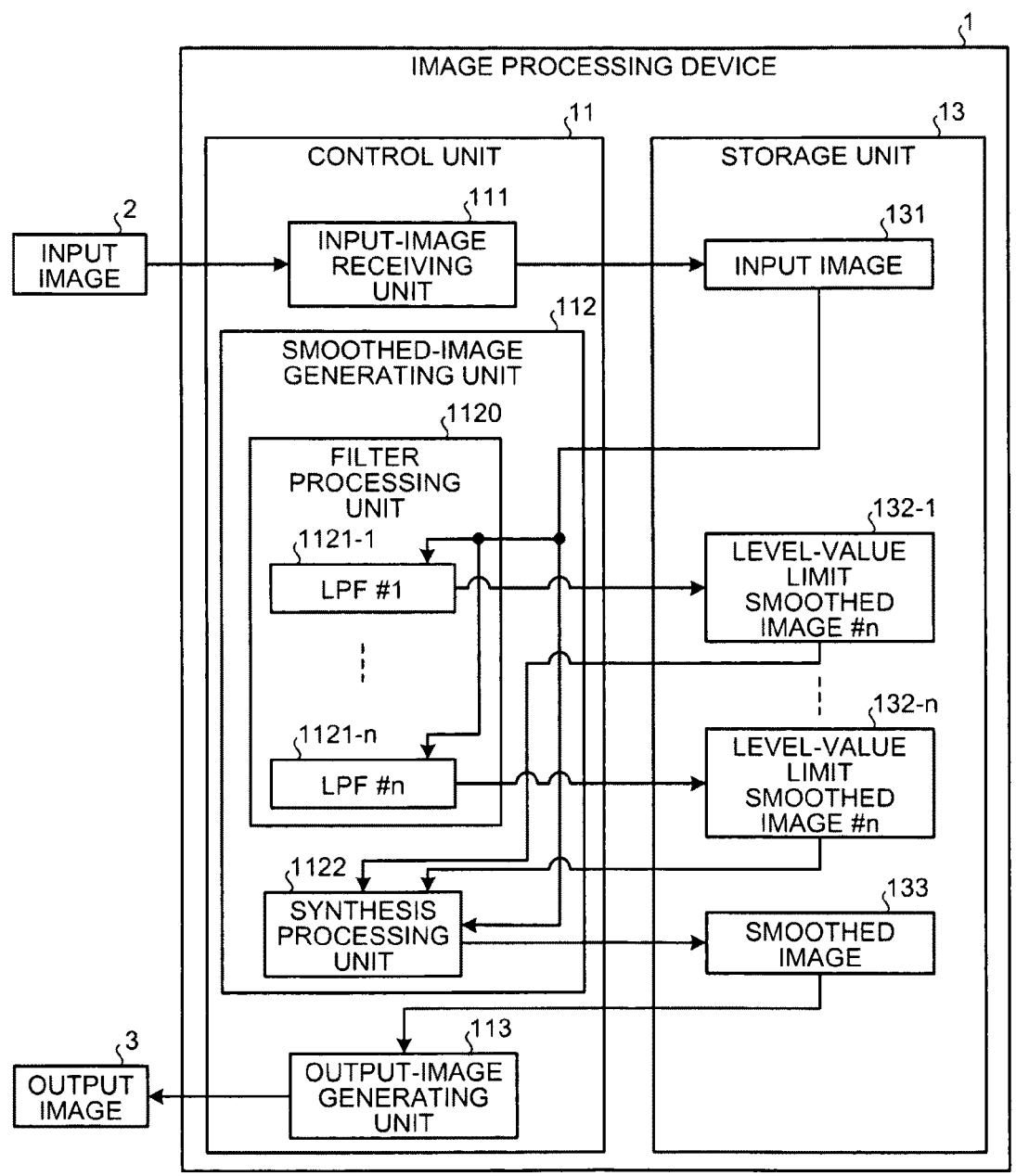
FIG. 1 is a block diagram of an image processing device according to a first embodiment.
Figure 2:
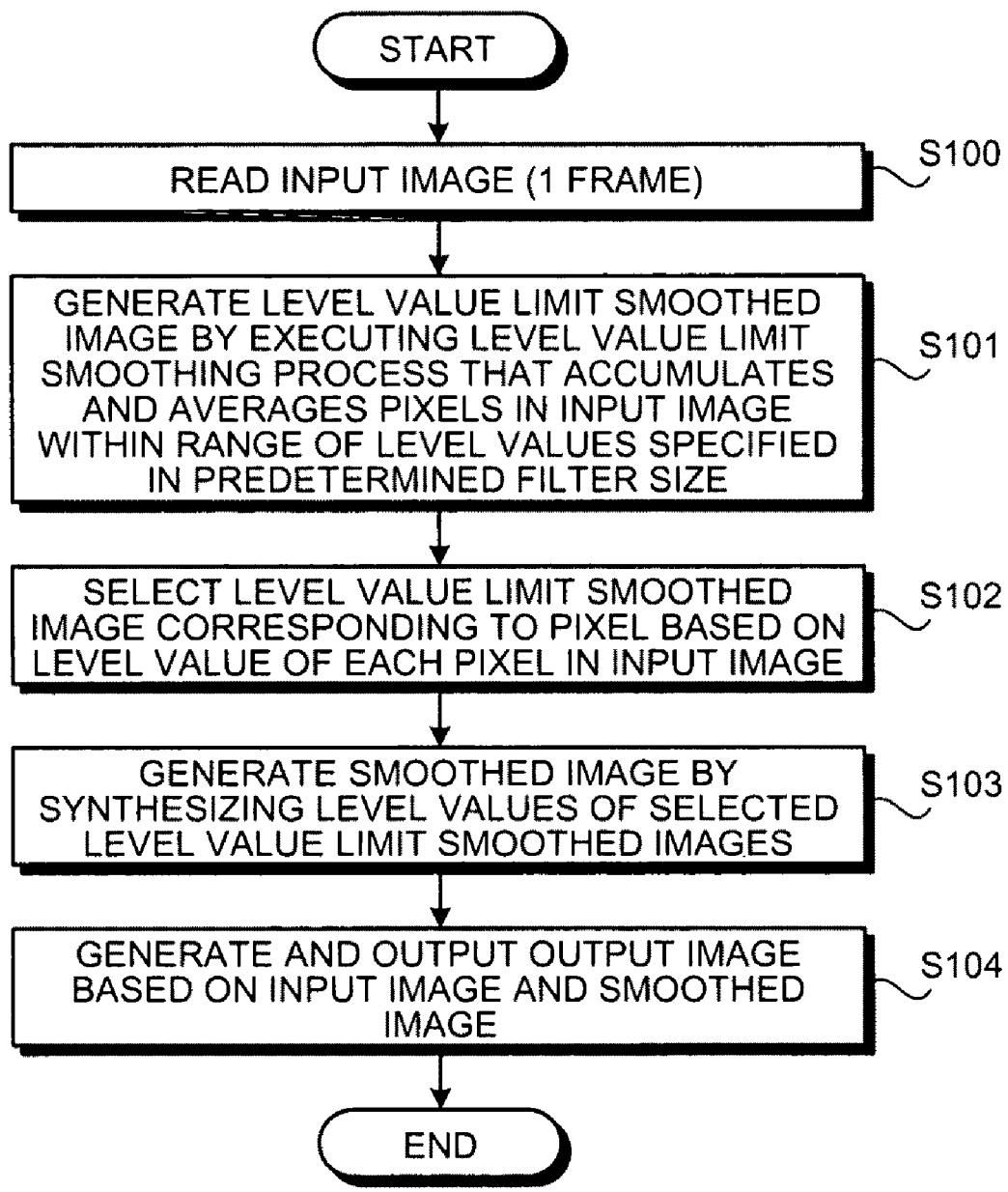
FIG. 2 is a flowchart for explaining an operation performed by the image processing device according to the first embodiment.

A first embodiment of the present invention will be described with reference to FIGS. 1 to 3. FIG. 1 is a block diagram of an image processing device according to the first embodiment of the present invention. In FIG. 1, an image processing device 1 includes a control unit 11 that receives an input image 2, smoothes the received input image 2, and generates an output image 3, and a storage unit 13 that stores various images therein. The input image 2 may be a moving image or a still image, and may be a color image or a monochrome image.

The control unit 11 includes an input-image receiving unit 111, a filter processing unit 1120 that has n (1<n, n being a natural number) pieces of low pass filters (hereinafter, referred to as "LPF") 1121-1 through 1121-n respectively set with different ranges of level values, and a synthesis processing unit 1122. The input-image receiving unit 111 reads the input image 2 and stores the image in the storage unit 13 as an input image 131.

The LPFs 1121-1 through 1121-n are one-dimensional low pass filters having the same filter size, respectively set in advance with different ranges of level values. The LPFs 1121-1 through 1121-n generate level value limit smoothed images 132-1 through 132-n, by carrying out a level value limit smoothing process that smoothes (calculate an average value of) pixels, whose level value of pixels in the input image 131 stored in the storage unit 13 falls within a range of level values set therein, as objects to be processed. The LPFs 1121-1 through 1121-n store the generated level value limit smoothed images 132-1 through 132-n in the storage unit 13.

It is preferable that the filter size of the LPFs 1121-1 through 1121-n be roughly a half of the image to be processed (in this case, the input image 131). However, the filter size may vary. It is also preferable that a part of the range of level values set in the LPFs 1121-1 through 1121-n overlap with at least two of the LPFs 1121-1 through 1121-n. However, it is acceptable as long as the range of level values of the input image is covered. The filter size and the range of level values of the LPFs 1121-1 through 1121-n may be set as fixed values or may be set from outside.

The synthesis processing unit 1122, based on the level value of each pixel in the input image 131 stored in the storage unit 13, selects the level value limit smoothed images 132-1 through 132-n with respect to the pixel. The synthesis processing unit 1122 then synthesizes the level values of the selected level value limit smoothed images 132-1 through 132-n, and generates a smoothed image 133. The synthesis processing unit 1122 stores the generated smoothed image 133 in the storage unit 13.

An output-image generating unit 113 generates and outputs the output image 3 based on the input image 131 and the smoothed image 133 stored in the storage unit 13.

Next, an operation performed by the image processing device 1 according to the first embodiment of the present invention is described with reference to a flowchart in FIG. 2, and FIGS. 1 and 3. The input-image receiving unit 111 reads the input image 2 of one frame (Step S100). In FIG. 3, an input image 40 is read. The input-image receiving unit 111 stores the read input image 2 in the storage unit 13 as the input image 131. In FIG. 3, the input-image receiving unit 111 reads the input image 40 and stores in the storage unit 13.

The filter processing unit 1120 generates the level value limit smoothed images 132-1 through 132-n, by carrying out the level value limit smoothing process that accumulates and averages the pixels in the input image 131 that fall within the range of level values specified in a predetermined filter size (Step S101). The average value may be calculated, by calculating a weighted average value based on the distance from the center of the filter, so as to increase the weight of the pixels in the center of the filter and decrease the weight of the pixels at both ends of the filter.

More specifically, the LPFs 1121-1 through 1121-n of the filter processing unit 1120, while performing a one-dimensional filter process on an image in the horizontal direction, determines whether the level value of the pixels in the input image 131 in the filter size falls within the range of level values set therein. The LPFs 1121-1 through 1121-n accumulate therein the level values of the pixels whose level value of the pixels in the input image 131 in the filter size is determined to fall within the range of level values set therein, and calculate the average value thereof. The LPFs 1121-1 through 1121-n, if there is no pixel whose level value of the pixels in the input image 131 in the filter size falls within the range of level values set therein, accumulate therein the level values of all the pixels in the input image 131 in the filter size, and calculate the average value thereof. The LPFs 1121-1 through 1121-n use any pixel in the filter size (such as a pixel positioned in the center in the filter size) as a pixel of interest, and use the calculated average value as a level value of the pixel of interest. Then, with respect to the image to which the filter process is performed on all the pixels in the horizontal direction, the one-dimensional filter process is similarly performed in the vertical direction. The LPFs 1121-1 through 1121-n generate the level value limit smoothed images 132-1 through 132-n, by calculating the level values of all the pixels in the input image 131 as pixel of interests, and store in the storage unit 13. The one-dimensional filter process may be performed in the vertical direction first, and may be carried out by two-dimensional filter.

When the number of pixels whose level value of the pixels in the input image 131 in the filter size falls within the range of level values set therein, is less than a predetermined threshold, it is possible to accumulate the level values of all the pixels and calculate the average value thereof. It is also possible to output the center level value, instead of accumulating the level values of all the pixels and calculating the average value thereof.

Figure 3:
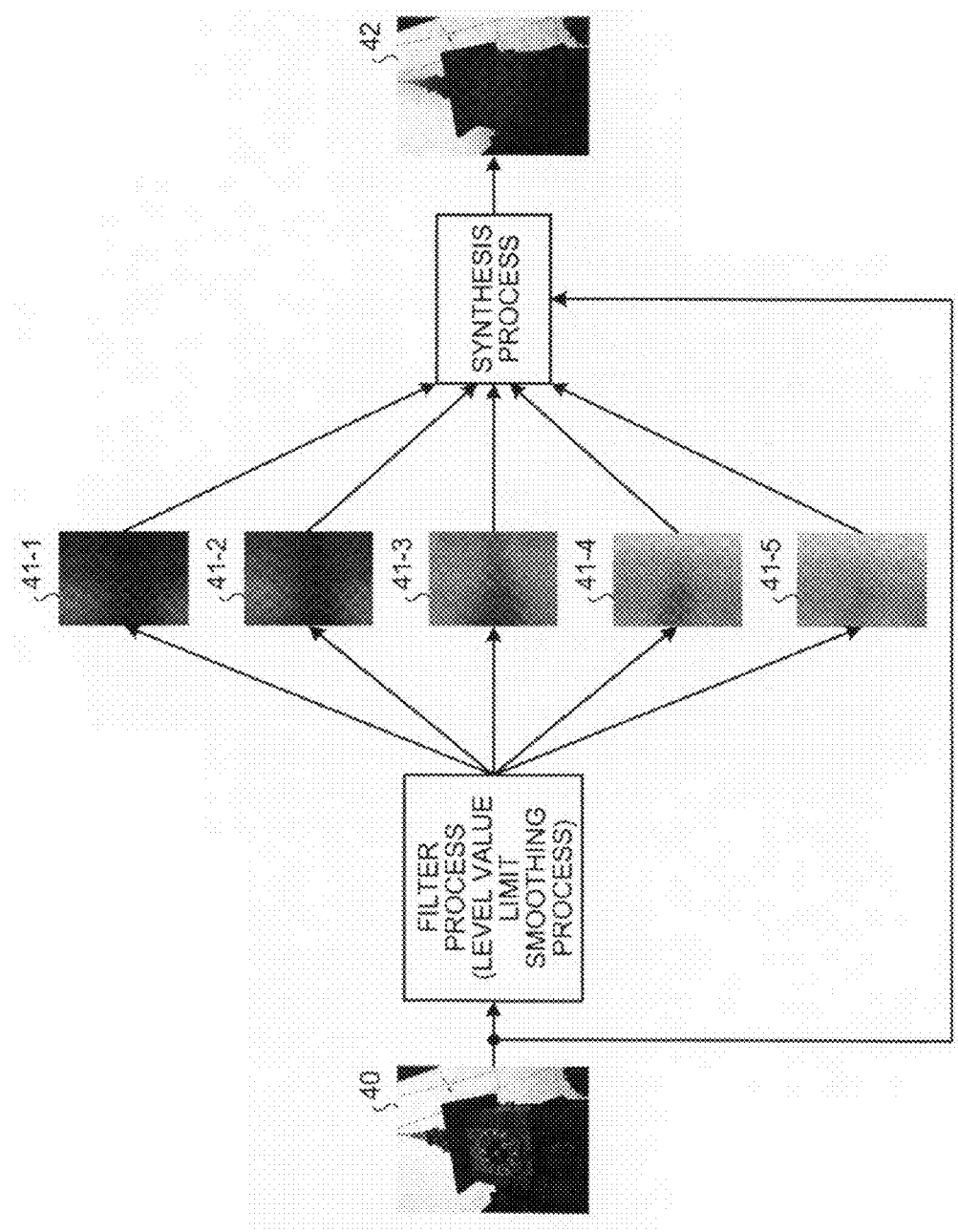
FIG. 3 is a schematic for explaining an operation performed by the image processing device according to the first embodiment.

In FIG. 3, n=5, in other words, the five LPFs 1121-1 through 1121-5 generate level value limit smoothed images 41-1 through 41-5, by carrying out the level value limit smoothing process with respect to the input image 40 within the range of level values being set respectively.

The synthesis processing unit 1122 selects the level value limit smoothed images 132-1 through 132-n that correspond to the pixel, based on the level value of each pixel in the input image 131 (Step S102). More specifically, the synthesis processing unit 1122 selects a pixel (processing object pixel) to be processed from the input image 131, and selects the level value limit smoothed images 132-1 through 132-n in which the level values of the selected processing object pixels are used as the range of level values. When the ranges of level values set in the LPFs 1121-1 through 1121-n are overlapped, a plurality of level value limit smoothed images 132-1 through 132-n using the level values of the processing object pixels as the range of level values is present. In this case, the synthesis processing unit 1122 selects equal to or more than two of the level value limit smoothed images 132-1 through 132-n, in which the difference between the center value of the range of level values and the level value of the processing object pixel is small.

The synthesis processing unit 1122 generates the smoothed image 133 by synthesizing the level values of the selected level value limit smoothed images 132-1 through 132-n (Step S103). More specifically, the synthesis processing unit 1122 extracts the level value of the pixel that corresponds to the position of the processing object pixel from the selected level value limit smoothed images 132-1 through 132-*n*, calculates the weighted average value of the extracted level values based on the difference between the center value of the range of level values and the level value of the processing object pixel, and uses the value as a level value of the pixel positioned at the processing object pixel. The synthesis processing unit 1122 generates the smoothed image 133, by calculating the level value of the pixel that corresponds to the position of the processing object pixel, by using all the pixels in the input image 131 as the processing object pixels. The synthesis processing unit 1122 stores the generated smoothed image 133 in the storage unit 13. In FIG. 3, the level value limit smoothed images 41-1 through 41-5 are selected for each pixel, based on the level value of each pixel in the input image 40, and a smoothed image 42 is generated by synthesizing the level values of the pixels in the selected level value limit smoothed images 41-1 through 41-5. If only one level value limit smoothed image is selected, the level value of the pixel positioned at the processing object pixel is the level value of the processing object pixel.

The output-image generating unit 113 generates and outputs the output image 3 based on the input image 131 and the smoothed image 133 (Step S104). More specifically, the output-image generating unit 113 calculates a low frequency component and a high frequency component from the input image 131 and the smoothed image 133. The low frequency component is the level value of the pixels in the smoothed image 133. The high frequency component is the difference between the level value of the pixels in the input image 131 and the level value of the pixels in the smoothed image 133 at the position corresponding to the pixels.

The output-image generating unit 113, after calculating the low frequency component and the high frequency component, compresses the dynamic range of the low frequency component. Accordingly, a process is performed to move the low frequency component (level value of each pixel in the smoothed image) closer to an intermediate value of the level range. A ratio used to move the low frequency component closer to the intermediate value is empirical, and it is common to set the level value approximately at a halfway between the level value of the pixels in the smoothed image 133 and the intermediate value. The output-image generating unit 113 generates an output image by adding the high frequency component of the pixel to the level value of each pixel in the smoothed image 133 moved closer to the intermediate value.

It is also possible to add an enlarged high frequency component, instead of simply adding the high frequency component thereto. In this case, it is possible to generate a sharp output image, by emphasizing the high frequency component. It is also possible to enlarge the high frequency component by nonlinear conversion, and add the enlarged high frequency component. In this case, it is possible to generate a naturally finished output image, by easing the change made to the high frequency component.

In this manner, in the first embodiment, the LPFs 1121-1 through 1121-*n* that are a plurality of first low pass filters respectively set with different ranges of level values, use each pixel in the input image 131 as a pixel of interest, extract a pixel whose level value of pixels including the pixel of interest in the filter size falls within the range of level values set therein, and generate the level value limit smoothed images 132-1 through 132-*n* that are first level value limit smoothed images by smoothing the level values of the extracted pixels to be used as a level value of the pixel of interest. The synthesis processing unit 1122 that is a first synthesis processing unit uses each pixel in the input image 131 as a processing object pixel, selects one or a plurality of level value limit smoothed images 132-1 through 132-*n* generated by the LPFs 1121-1 through 1121-*n* set with the range of level values including a level value of the processing object pixel, and generates the smoothed image 133 that uses a value calculated from a level value of one or a plurality of pixels positioned at the processing object pixel or in the vicinity thereof, in the selected level value limit smoothed images 132-1 through 132-*n* as the level value of the processing object pixel. Accordingly, it is possible to process the plurality of LPFs 1121-1 through 1121-*n* by performing a fixing process without performing a conditional branch process. It is also possible to quickly generate the smoothed image 133 in which the edge of the input image 131 is accurately maintained and the portion other than the edge is blurred.

In the first embodiment, the LPFs 1121-1 through 1121-*n*, which are the first low pass filters, are one-dimensional low pass filters, and smoothes by sequentially performing a horizontal direction smoothing process and a vertical direction smoothing process. Accordingly, compared with when a two-dimensional low pass filter is used, it is possible to reduce the processing load, and to quickly generate a smoothed image in which the edge of the input image is accurately maintained and the portion other than the edge is blurred.

The functions realized by the input-image receiving unit 111, the LPFs 1121-1 through 1121-*n*, the synthesis processing unit 1122, and the output-image generating unit 113 of the first embodiment may be provided as an image processing program that enables a general-purpose computer to realize the functions. In this case, the image processing program is recorded and provided in a computer-readable recording medium such as a ROM, a CD-ROM, a floppy (trademark) disk, and a DVD, in a file in a form that can be installed in a computer, or in a form that can be executed by a computer. The image processing program recorded in the recording medium is read from the recording medium, and realized on the computer.

[b] Second Embodiment

Figure 4:
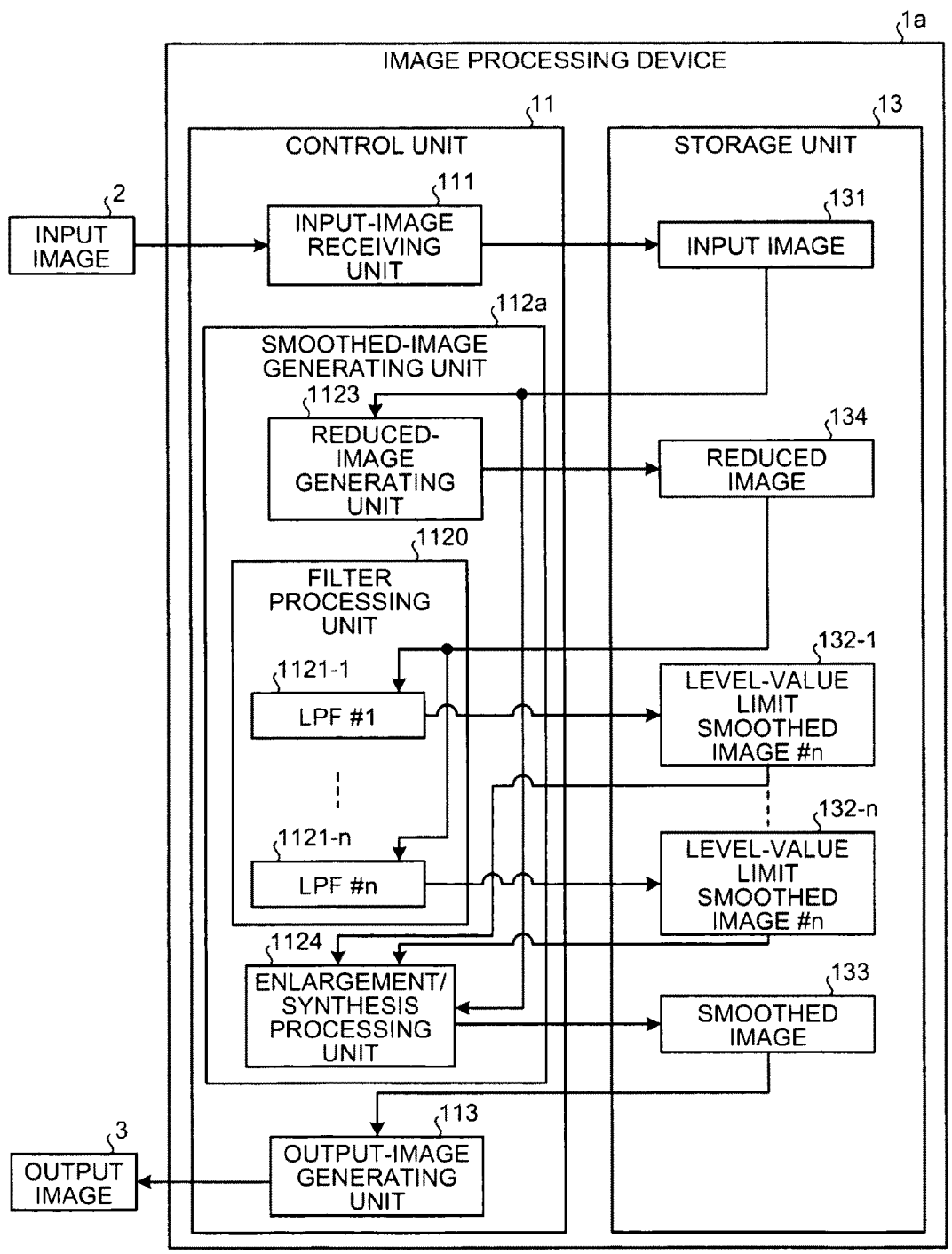
FIG. 4 is a block diagram of an image processing device according to a second embodiment.

A second embodiment according to the present invention is described with reference to FIGS. 4 to 7. FIG. 4 is a block diagram of an image processing device according to the second embodiment of the present invention. An image processing device 1*a* depicted in FIG. 4 includes a smoothed-image generating unit 112*a*, instead of a smoothed-image generating unit 112 in the image processing device 1 according to the first embodiment previously depicted in FIG. 1. The elements having the same functions as those in the image processing device 1 according to the first embodiment previously depicted in FIG. 1 are denoted by the same reference numerals, and the descriptions thereof will be omitted.

The smoothed-image generating unit 112*a* includes an enlargement/synthesis processing unit 1124 instead of the synthesis processing unit 1122 of the smoothed-image generating unit 112 previously depicted in FIG. 1, and a reduced-image generating unit 1123 is added thereto. The reduced-image generating unit 1123 generates a reduced image 134 by reducing (the number of pixels is reduced from) the input image 131, by taking out pixels in the input image 131 stored in the storage unit 13 and stores the image in the storage unit 13. It is preferable that the size of the input image 131 be reduced approximately to one sixty-fourth. However, the size is not limited thereto.

The LPFs 1121-1 through 1121-*n* in the filter processing unit 1120 carry out the level value limit smoothing processing with respect to the reduced image 134, generate the level value limit smoothed images 132-1 through 132-*n*, and store the images in the storage unit 13. Because the image to be processed by the LPFs 1121-1 through 1121-$n$ is the reduced image 134, the filter size of the LPFs 1121-1 through 1121-$n$ is set to a value suitable for the reduced image 134 (such as a half of the reduced image 134).

The enlargement/synthesis processing unit 1124 enlarges the level value limit smoothed images 132-1 through 132-$n$ stored in the storage unit 13 to the size of the input image 131, and based on the level value of each pixel in the input image 131 stored in the storage unit 13, selects the enlarged level value limit smoothed images 132-1 through 132-$n$ that correspond to the pixel. The enlargement/synthesis processing unit 1124 also generates the smoothed image 133 by synthesizing the level values of the level value limit smoothed images 132-1 through 132-$n$ being selected and enlarged. The enlargement/synthesis processing unit 1124 stores the generated smoothed image 133 in the storage unit 13.

Figure 5:
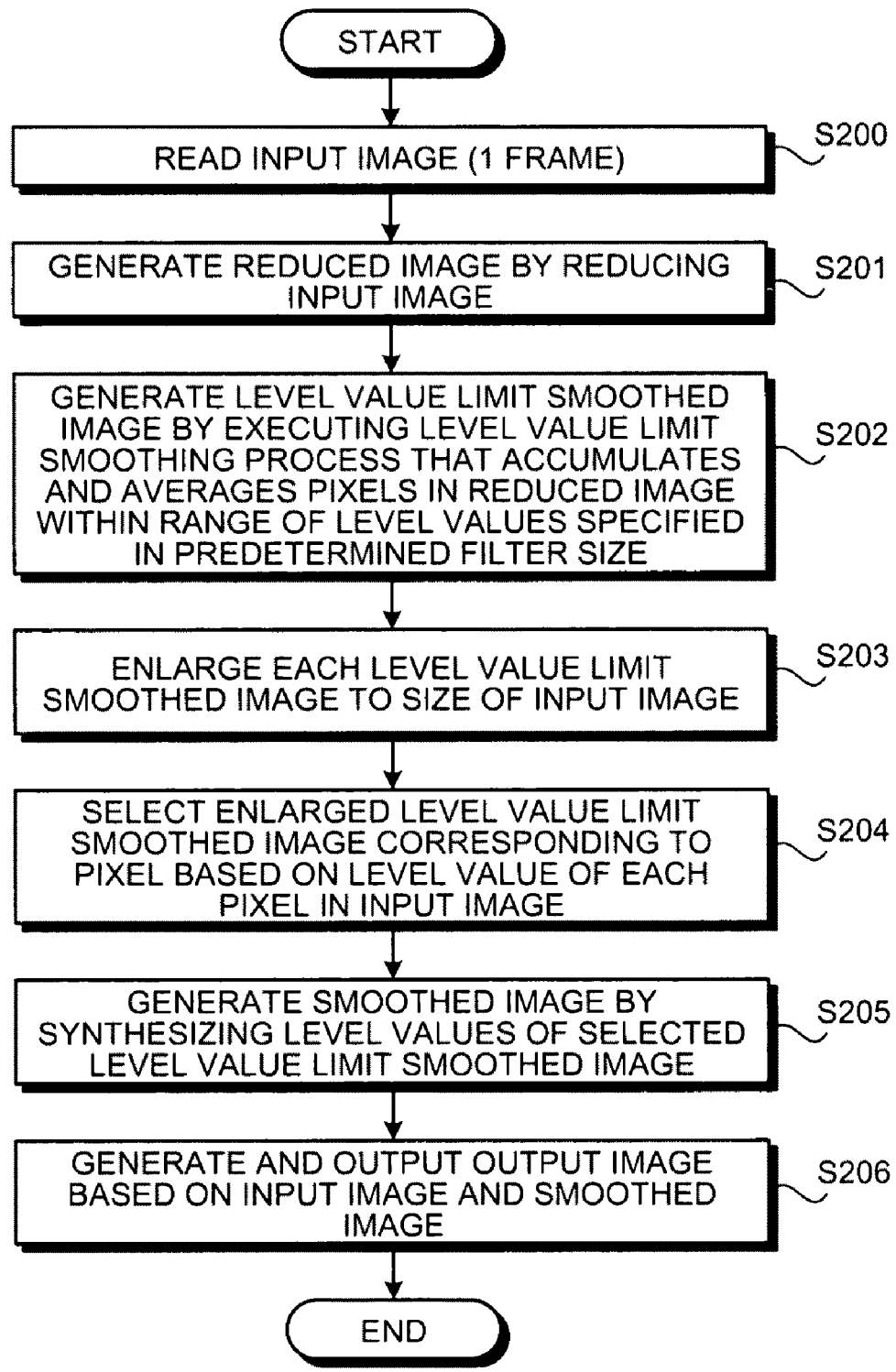
FIG. 5 is a flowchart for explaining an operation performed by the image processing device according to the second embodiment.

Next, an operation performed by the image processing device 1$a$ according to the present invention is described with reference to a flowchart in FIG. 5, and FIGS. 4 and 6. Detailed description of the same operations as those in the image processing device 1 according to the first embodiment previously described with reference to the flowchart in FIG. 2 will be omitted.

The input-image receiving unit 111 reads the input image 2 of one frame and stores the image in the storage unit 13 as the input image 131 (Step S200). In FIG. 6, the input-image receiving unit 111 reads an input image 45.

The reduced-image generating unit 1123 generates the reduced image 134 by reducing (the number of pixels is reduced from) the input image 131, by taking out pixels therefrom (Step S201). More specifically, the reduced-image generating unit 1123 extracts pixels in the input image 131 at every predetermined value, and generates the reduced image 134 formed only by the extracted pixels. The reduced-image generating unit 1123 stores the generated reduced image 134 in the storage unit 13. In FIG. 6, a reduced image 46 is generated from the input image 45. It is also possible to store the reduced image being reduced externally in the storage unit 13, without including the reduced-image generating unit.

The filter processing unit 1120 generates the level value limit smoothed images 132-1 through 132-$n$, by carrying out the level value limit smoothing process that accumulates and averages the pixels in the reduced image 134 that fall within the range of level values specified in a predetermined filter size (Step S202). The average value may be calculated, by calculating a weighted average value based on the distance from the center of the filter, so as to increase the weight of the pixels in the center of the filter and decrease the weight of the pixels at both ends of the filter.

More specifically, the LPFs 1121-1 through 1121-$n$ of the filter processing unit 1120, if there is a level value of the pixel whose level value of the pixels in the reduced image 134 in the filter size falls within the range of level values set therein, calculate the average value by accumulating therein the level values thereof. If there is no level value of the pixel whose level value of the pixels in the reduced image 134 in the filter size falls within the range of the level values set therein, the LPFs 1121-1 through 1121-$n$ of the filter processing unit 1120 calculates the average value by accumulating therein the level values of all the pixels in the filter size. The LPFs 1121-1 through 1121-$n$ generate the level value limit smoothed images 132-1 through 132-$n$ with respect to the reduced image 134, by using the calculated average value as the level value of the pixel of interest. The LPFs 1121-1 through 1121-$n$ store the generated level value limit smoothed images 132-1 through 132-$n$ in the storage unit 13.

When the number of pixels whose level value of the pixels in the reduced image 134 in the filter size falls within the range of level values set therein, is less than a predetermined threshold, it is possible to accumulate the level values of all the pixels and calculate the average value thereof. It is also possible to output the center level value, instead of accumulating the level values of all the pixels and calculating the average value thereof.

Figure 6:
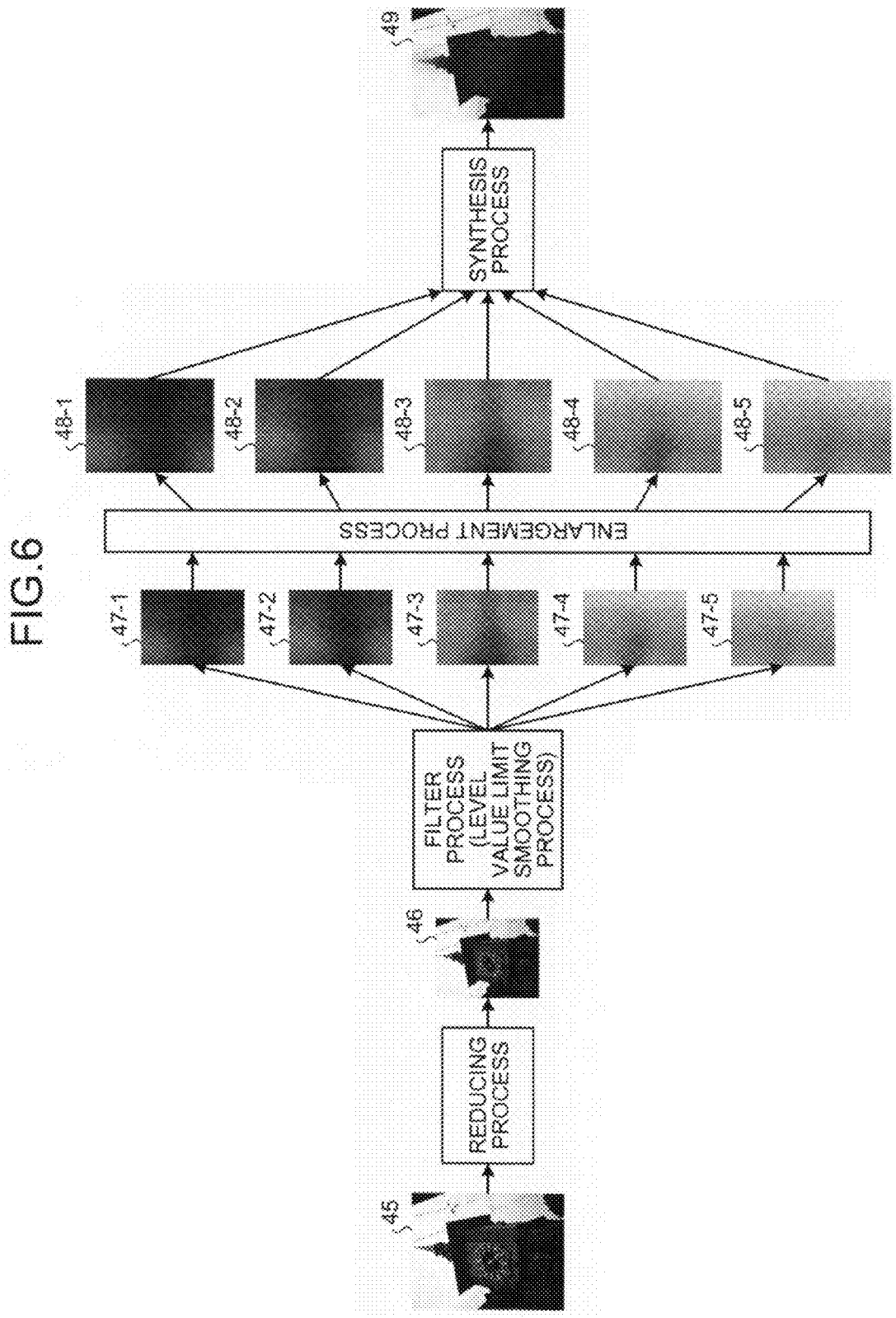
FIG. 6 is a schematic for explaining an operation performed by the image processing device according to the second embodiment.

In FIG. 6, $n=5$, in other words, the five LPFs 1121-1 through 1121-5 generate level value limit smoothed images 47-1 through 47-5, by carrying out the level value limit smoothing process with respect to the reduced image 46 within the range of level values being set respectively.

The enlargement/synthesis processing unit 1124 enlarges the level value limit smoothed images 132-1 through 132-$n$ stored in the storage unit 13 to the size of the input image 131 (Step S203). The enlargement may be carried out by using a general interpolation method for image processing such as a bilinear method. In FIG. 6, level value limit smoothed images 48-1 through 48-5 formed by enlarging the level value limit smoothed images 47-1 through 47-5 are generated.

The enlargement/synthesis processing unit 1124, based on the level value of each pixel in the input image 131, selects the enlarged level value limit smoothed images 132-1 through 132-$n$ that correspond to the pixel (Step S204). The enlargement/synthesis processing unit 1124 generates the smoothed image 133 by synthesizing the level values of the level value limit smoothed images 132-1 through 132-$n$ being selected and enlarged (Step S205). The enlargement/synthesis processing unit 1124 stores the generated smoothed image 133 in the storage unit 13. In FIG. 6, the enlarged level value limit smoothed images 48-1 through 48-5 are selected based on the level value of each pixel in the input image 45, and a smoothed image 49 is generated by synthesizing the level values of the pixels in the level value limit smoothed images 48-1 through 48-5 being selected and enlarged. The synthesizing may be performed, by calculating a weighted average value of the level values of the selected level value limit smoothed images, based on the difference between the center value of the range of level values and the level value of the processing object pixel.

The output-image generating unit 113 generates and outputs the output image 3 based on the input image 131 and the smoothed image 133 (Step S206).

In this manner, in the second embodiment, the reduced-image generating unit 1123 generates the reduced image 134 (first input image generated based on the input image 131) of the input image 131, by extracting any pixel from the pixels in the input image 131. The LPFs 1121-1 through 1121-$n$, which are the plurality of first low pass filters, respectively set with different ranges of level values, by using a pixel in the reduced image 134 generated by the reduced-image generating unit 1123, extract a pixel whose level value of pixels including the pixel of interest in the filter size falls within the range of level values set therein, and generate the level value limit smoothed images 132-1 through 132-$n$, which are the first level value limit smoothed images by smoothing the level values of the extracted pixels to be used as a level value of the pixel of interest. The enlargement/synthesis processing unit 1124, which is the first synthesis processing unit, interpolates and enlarges the pixels in the level value limit smoothed images 132-1 through 132-$n$ generated from the reduced image 134 based on the input image 131, by using each pixel in the input image 131 as a processing object pixel, selects one or a plurality of images formed by enlarging the level value limit smoothed images 132-1 through 132-$n$ generated by the LPFs 1121-1 through 1121-$n$ set with the range of level values including the level value of processing object pixel. The enlargement/synthesis processing unit 1124 also generates the smoothed image 133 that uses a value calculated from the level value of the pixel that corresponds to the position of the processing object pixel in the selected image, as the level value of the processing object pixel. Accordingly, it is possible to reduce the number of pixels to be processed by the LPFs 1121-1 through 1121-$n$, and to quickly generate a smoothed image in which the edge of the input image 131 is accurately maintained and the portion other than the edge is blurred.

In the second embodiment, the level value limit smoothed images 132-1 through 132-$n$ (in FIG. 6, the level value limit smoothed images 47-1 through 47-5) are respectively interpolated and enlarged to the size of the input image 131 (in FIG. 6, the input image 45), and then synthesized with the level value limit smoothed images 132-1 through 132-$n$ (in FIG. 6, the level value limit smoothed images 48-1 through 48-5), enlarged based on the input image 131 (in the diagram, the input image 45). However, enlarging and synthesizing may be performed at the same time.

Figure 7:
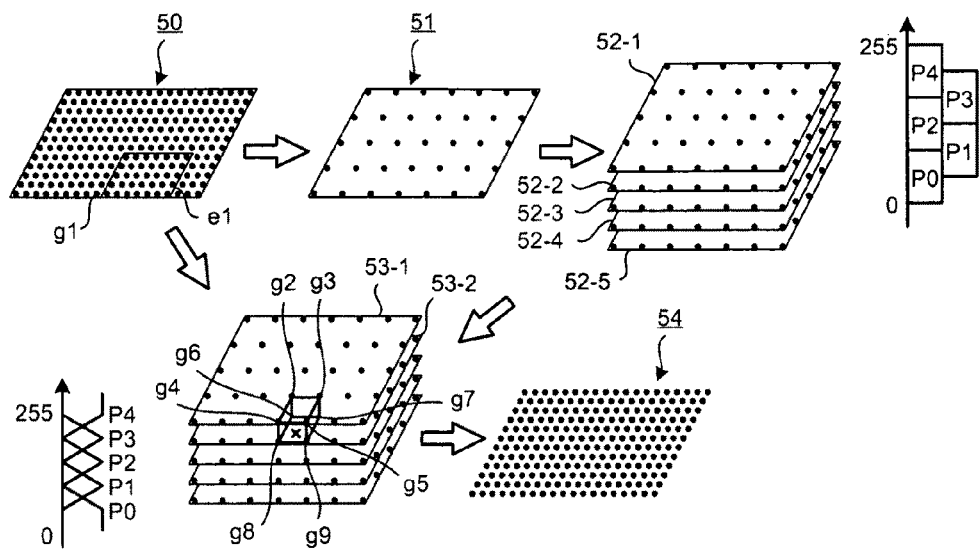
FIG. 7 is a schematic for explaining an enlargement and synthesis process.

A specific operation of enlarging and synthesizing at the same time will be described with reference to FIG. 7. In FIG. 7, the level values are roughly divided into one third each of dark, middle, and bright. A range of level values P0 that indicates dark is set to the LPF 1121-5, a range of level values P2 that indicates middle is set to the LPF 1121-3, and a range of level values P4 that indicates bright is set to the LPF 1121-1. A range of level values P1 that indicates somewhat dark from the center of the range of level values P0 to the center of the range of level values P2 is set to the LPF 1121-4, and a range of level value P3 that indicates somewhat bright from the center of the range of level values P2 to the center of the range of level values P4 is set to the LPF 1121-2.

The reduced-image generating unit 1123 extracts pixels in an input image 50 at every three pixels, both in the vertical direction and in the horizontal direction, thereby generating a reduced image 51. The LPFs 1121-1 through 1121-5 generate level value limit smoothed images 52-1 through 52-5, by carrying out the level value limit smoothing process with respect to the reduced image 51.

The enlargement/synthesis processing unit 1124 selects an object pixel. For example, assume that the enlargement/synthesis processing unit 1124 selects a pixel g1 in the input image 50 as an object pixel. The enlargement/synthesis processing unit 1124 selects the level value limit smoothed images 52-1 through 52-5 based on the level value of the pixel g1. When the level value of the object pixel g1 is included in the range of level values P4, the enlargement/synthesis processing unit 1124 selects the level value limit smoothed image 52-1 (level value limit smoothed image 53-1). The enlargement/synthesis processing unit 1124 selects a pixel g2 and the adjacent pixels g3 through g5 in the level value limit smoothed image 53-1 that correspond to the object pixel g1. The enlargement/synthesis processing unit 1124 then selects pixels g6 through g9 that correspond to the pixels g2 through g5 in the level value limit smoothed image 53-1, from the pixels in a level value limit smoothed image 53-2 (level value limit smoothed image 52-2) closest to the range of level values of the selected level value limit smoothed image 53-1. The enlargement/synthesis processing unit 1124 enlarges a portion that corresponds to a region e1 of the input image 50, by interpolating the level values (3D-interpolation) by entering the level values and positions (XY coordinates) of the selected eight pixels g2 through g9. At this time, the enlargement/synthesis processing unit 1124, when there is a pixel that has a level value not included in the range of level values P4, in the level values of the pixels at the position of the region e1 of the input image 50, selects the level value limit smoothed images 52-2 through 52-3 that fall within the range of level values including the level value of the pixel. The enlargement/synthesis processing unit 1124 then enlarges a portion that corresponds to the region e1 of the input image 50, by interpolating the level values (3D-interpolation) by entering the level values and the positions (XY coordinates) of the pixel that correspond to the object pixel g1 and the pixels (pixels at the positions corresponding to the pixels g2 through g9) adjacent to the pixel. In other words, the enlargement/synthesis processing unit 1124 only enlarges the portion that corresponds to the region e1 of the level value limit smoothed images 52-1 through 52-5 including the level value of each pixel in the region e1 of the input image 50.

The enlargement/synthesis processing unit 1124 selects the level value limit smoothed images 53-1 through 53-$n$ based on the level value of the pixel for each pixel in the region e1 of the input image 50, synthesizes the level values, and generates a smoothed image 54. The synthesizing may be performed, as described in the first embodiment, by calculating a weighted average value of the level values of the selected level value limit smoothed images, based on the difference between the center value of the range of level values and the level value of the processing object pixel. A specific operation will be described with reference to FIG. 7.

The ranges of level values of the P0 through P4 are respectively set at 0 through 84, 42 through 128, 85 through 160, 129 through 212, and 161 through 255. When the level value of the processing object pixel is 60, the ranges of level values that includes 60 is the P0 whose range of level values is 0 through 84, and the P1 whose range of level values is 42 through 128. Accordingly, the LPF 1121-5 and the LPF 1121-4 will be selected. At this time, the center value of the range of level values of the P0 is 42, and the center value of the range of level values of the P1 is 85. Consequently, a value to be calculated as the level value of the processing object pixel is obtained by calculating a weighted average value so as to increase the weight of the pixel level value of the LPF 1121-5 that has the center value of the range of level values closer to 60, which is the level value of the processing object pixel. Specifically, it is defined as follows: pixel level value of LPF 1121-5×(25/43)+ pixel level value of LPF 1121-4×(18/43).

In this manner, the enlargement/synthesis processing unit 1124, which is the first synthesis processing unit, interpolates the level value limit smoothed images 132-1 through 132-$n$ by interpolating the level values using 3-D interpolation, by using the level values and the positional information of the pixels in the level value limit smoothed images 132-1 through 132-$n$, which are the first level value limit smoothed images. Because only the required portion is interpolated and enlarged, without interpolating all the level value limit smoothed images 132-1 through 132-$n$, it is possible to reduce time required for the enlargement process. Accordingly, it is possible to quickly generate the smoothed image 133 in which the edge of the input image 131 is accurately maintained and the portion other than the edge is blurred.

Because the enlargement/synthesis processing unit 1124 generates the smoothed image 133 by weighted averaging the level values of the pixels in the level value limit smoothed images 132-1 through 132-$n$, it is possible to improve the quality of the smoothed image in which the edge of the input image is accurately maintained and the portion other than the edge is blurred.

The functions realized by the input-image receiving unit 111, the reduced-image generating unit 1123, the LPFs 1121-1 through 1121-$n$, the enlargement/synthesis processing unit 1124, and the output-image generating unit 113 of the second embodiment may be provided as an image processing program that enables a general-purpose computer to realize the function. In this case, the image processing program is recorded and provided in a computer-readable recording medium such as a ROM, a CD-ROM, a floppy (trademark) disk, and a DVD, in a file in a form that can be installed in a computer, or in a form that can be executed by a computer. The image processing program recorded in the recording medium is read from the recording medium, and realized on the computer.

[c] Third Embodiment

A third embodiment of the present invention will be described with reference to FIG. 8. In the third embodiment, the weighting when the level value limit smoothed images 132-1 through 132-*n* are generated by the LPFs 1121-1 through 1121-*n* of the image processing device 1 or the image processing device 1*a* described in the first or the second embodiments will be described.

In moving images, a pixel whose level value is close to the upper limit or the lower limit of the range of level values may sometimes have a level value within the range of level values, different from the present range of level values in the subsequent images. In other words, the level values of the pixel at the same position in a different frame may vary. The output-image generating unit 113 generates the output image 3 in which the level value of the smoothed image 133 is emphasized, based on the input image 131 and the smoothed image 133. Accordingly, if the level value varies, the quality of the moving image deteriorates. To improve such a problem, a weighting is performed based on the level value, when the LPFs 1121-1 through 1121-*n* generate the level value limit smoothed images 132-1 through 132-*n*, in other words, when calculating the average value of the level values of the pixel.

Figure 8:
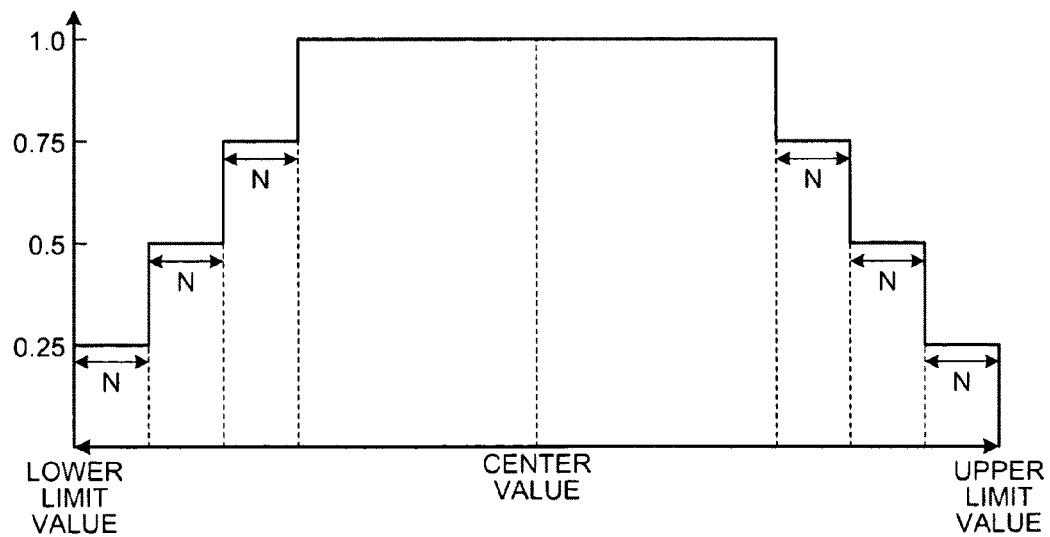
FIG. 8 is a schematic for explaining weighting.

FIG. 8 is a schematic of an example of a weighting in the range of level values. In FIG. 8, the weighting of the level values is divided into four steps of 0.25, 0.5, 0.75, and 1.0. The weighting to a level N (N being a natural number) towards the center value from the lower limit value and an upper limit value of the range of level values is 0.25. The weighting from the level N to a level 2N towards the center value from the lower limit value and the upper limit value of the range of level values is 0.5. The weighting from the level 2N to a level 3N towards the center value from the lower limit value and the upper limit value of the range of level values is 0.75. The weighting from the level 3N towards the center value from the lower limit value of the range of level values to the level 3N towards the center value from the upper limit value of the range of level values is 1.0.

For example, a formula when the LPFs 1121-1 through 1121-*n* smooth a level value a1 included in an area from the level N to the level 2N towards the center value from the lower limit value and the upper limit value of the range of level values, a level value a2 included from the level 2N to the level 3N towards the center value from the lower limit value and the upper limit value of the range of level values, and a3 included from the level 3N towards the center value from the lower limit value of the range of level values to the level 3N towards the center value from the upper limit value of the range of level values, can be expressed as follows:

$$(0.5 \times a1 + 0.75 \times a2 + 1.0 \times a3)/(0.5 \times 1 + 0.75 \times 1 + 1.0 \times 1).$$

In other words, the LPFs 1121-1 through 1121-*n* performs weighting and smoothing with respect to the level value and the number of pixels that includes the level value.

In this manner, in the third embodiment, the LPFs 1121-1 through 1121-*n*, which are the plurality of first low pass filters, calculate the average value by increasing weight as moving closer to the center value from the lower limit value and the upper limit value, within the range of level values set therein. Accordingly, even if the input image 131 is a moving image, it is possible to generate the high quality output image 3 in which the effects caused by fluctuation of level values are suppressed.

In the third embodiment, the weighting of the level value is divided into four steps. However, it is not limited thereto. The levels towards the center value from the lower limit value and the upper limit value are multiples of N. However, the levels may respectively vary. The weighting value is not limited thereto, and is acceptable as long as the weighting is set so as to increase towards the center value from the lower limit value and the upper limit value. The level and the weighting may be set in the LPFs 1121-1 through 1121-*n* in advance, or may set any value from outside.

[d] Fourth Embodiment

Figure 9:
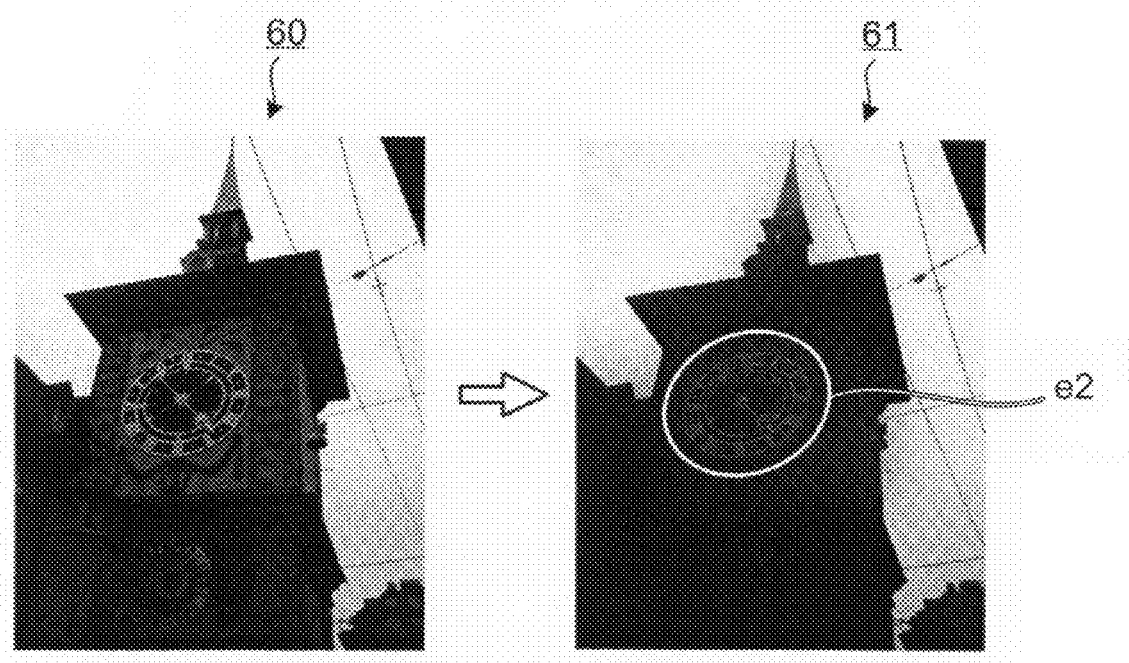
FIG. 9 is a schematic for explaining a microstructure.

A fourth embodiment of the present invention will be described with reference to FIGS. 9 to 13. In the first to the third embodiments, the smoothed image 133 is generated by generating the level value limit smoothed images 132-1 through 132-*n* by carrying out the level value limit smoothing process that accumulates and averages the pixels whose level value of the pixels in the input image 131 or the reduced image 134 falls within the range of level values set therein, and synthesizing the level values of the level value limit smoothed images 132-1 through 132-*n* or the enlarged level value limit smoothed images 132-1 through 132-*n*. However, depending on the input image 131, there is a possibility of leaving a microstructure. For example, as depicted in FIG. 9, a microstructure is left on a region e2 of a smoothed image 61 generated from an input image 60. To improve such a problem, in the fourth embodiment, the microstructure in a smoothed image is eliminated, by using a plurality of LPFs with two types of different filter sizes.

Figure 10:
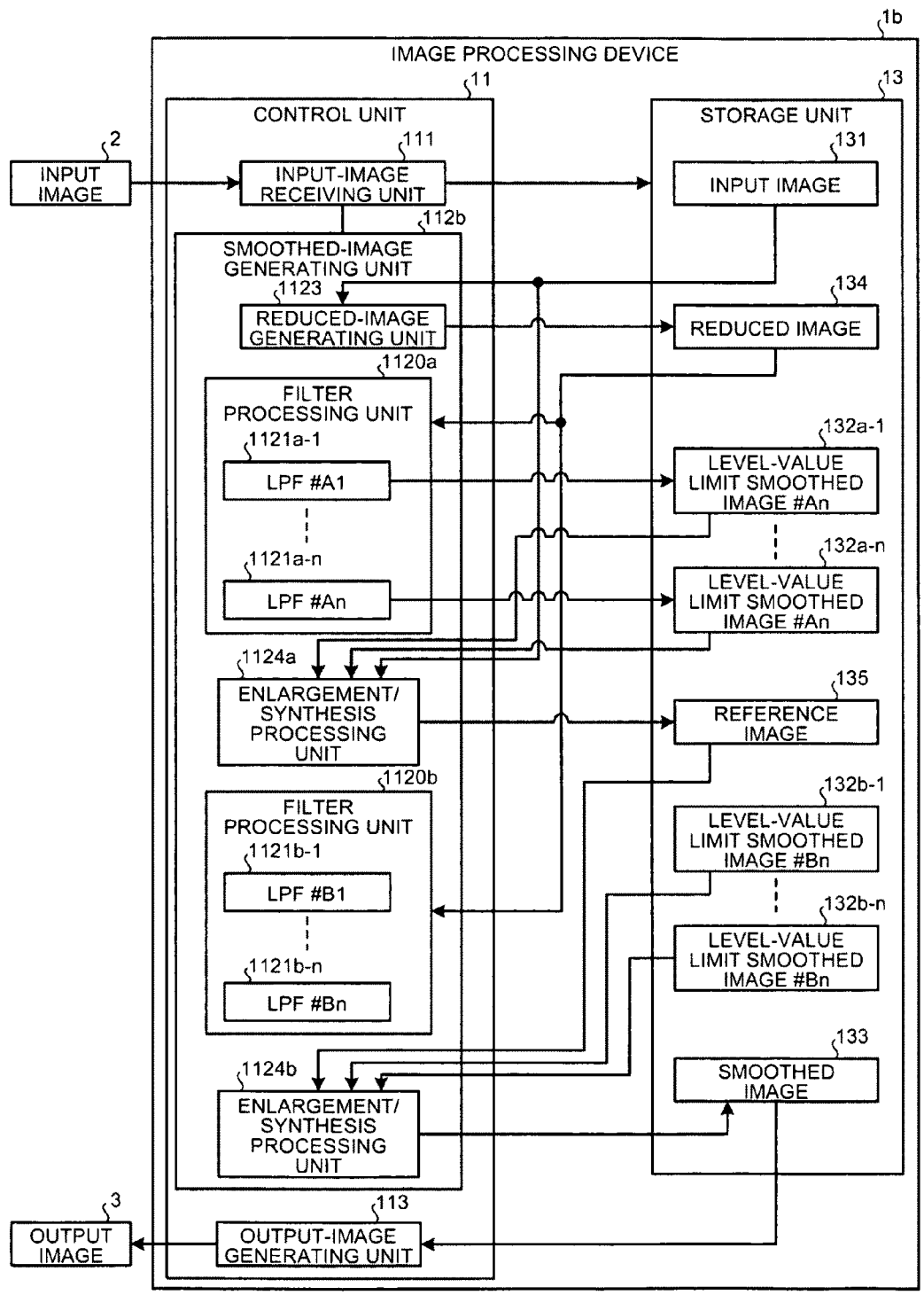
FIG. 10 is a block diagram of an image processing device according to a fourth embodiment.
Figure 11:
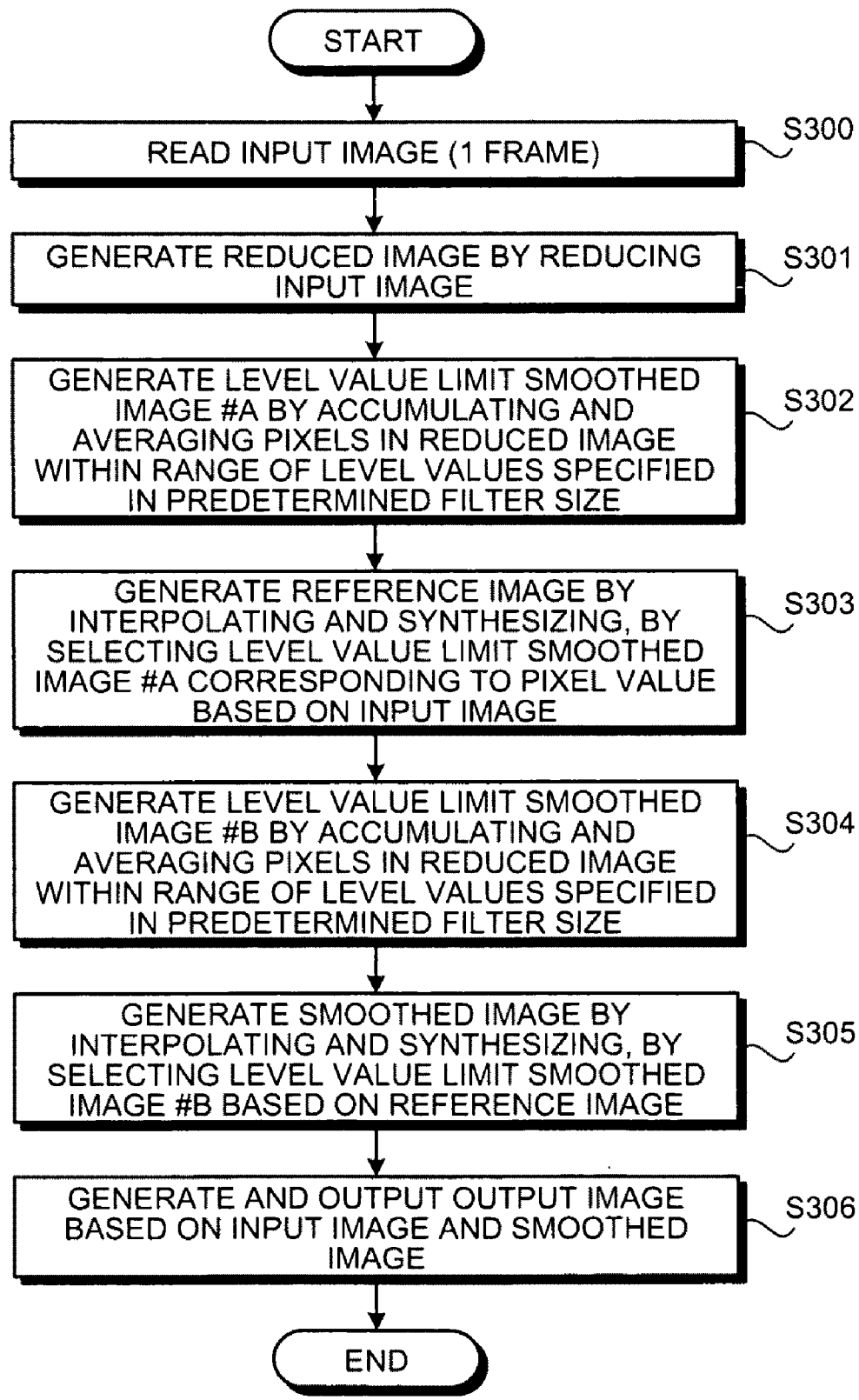
FIG. 11 is a flowchart for explaining an operation performed by the image processing device according to the fourth embodiment.

FIG. 10 is a block diagram of an image processing device 1*b* according to a fourth embodiment of the present invention. The image processing device 1*b* according to the fourth embodiment depicted in FIG. 10 includes a smoothed-image generating unit 112*b* instead of the smoothed-image generating unit 112*a* in the second embodiment previously depicted in FIG. 4. The smoothed-image generating unit 112*b* includes the reduced-image generating unit 1123, a filter processing unit 1120*a* that has LPFs 1121*a*-1 through 1121*a*-*n*, a filter processing unit 1120*b* that has LPFs 1121*b*-1 through 1121*b*-*n*, and enlargement/synthesis processing units 1124*a* and 1124*b*. The elements having the same functions as those in the image processing device 1*a* according to the second embodiment previously depicted in FIG. 4 are denoted by the same reference numerals, and the descriptions thereof will be omitted.

The LPFs 1121*a*-1 through 1121*a*-*n* are one-dimensional low pass filters having the same filter size, respectively set in advance with different ranges of level values. The LPFs 1121*a*-1 through 1121*a*-*n* generate level value limit smoothed images 132*a*-1 through 132*a*-*n* by carrying out the level value limit smoothing process that smoothes (calculate the average value of) the pixels whose level value of the pixels in the reduced image 134 stored in the storage unit 13 falls within the range of level values set therein, as a processing object. The LPFs 1121*a*-1 through 1121*a*-*n* store the generated level value limit smoothed images 132*a*-1 through 132*a*-*n* in the storage unit 13.

The LPFs 1121*b*-1 through 1121*b*-*n* are one-dimensional low pass filters having the same filter size different from the filter size of the LPFs 1121*a*-1 through 1121*a*-*n*, set in advance with the different ranges of level values. The LPFs 1121b-1 through 1121b-n generate level value limit smoothed images 132b-1 through 132b-n by carrying out the level value limit smoothing process that smoothes (calculate the average value of) the pixels whose level value of the pixels in the reduced image 134 stored in the storage unit 13 falls within the range of level values set therein, as a processing object. The LPFs 1121b-1 through 1121b-n store the generated level value limit smoothed images 132b-1 through 132b-n in the storage unit 13.

It is preferable that the filter size of the LPF included in one of the filter processing units be roughly a half of the image (in this case, the reduced image 134) to be processed, and the filter size of the LPF included in the other filter processing unit is roughly one tenth of the image (in this case, the reduced image 134) to be processed. However, the size is not limited thereto.

The enlargement/synthesis processing unit 1124a enlarges the level value limit smoothed images 132a-1 through 132a-n stored in the storage unit 13 to the size of the input image 131. The enlargement/synthesis processing unit 1124a, based on the level value of each pixel in the input image 131 stored in the storage unit 13, selects the enlarged level value limit smoothed images 132a-1 through 132a-n that correspond to the pixel, and generates a reference image 135 by synthesizing the level values of the level value limit smoothed images 132a-1 through 132a-n being selected and enlarged. The enlargement/synthesis processing unit 1124a stores the generated reference image 135 in the storage unit 13.

The enlargement/synthesis processing unit 1124b enlarges the level value limit smoothed images 132b-1 through 132b-n stored in the storage unit 13 to the size of the reference image 135 (equivalent to the size of the input image 131). The enlargement/synthesis processing unit 1124b, based on the level value of each pixel in the reference image 135 stored in the storage unit 13, selects the enlarged level value limit smoothed images 132b-1 through 132b-n that correspond to the pixel, and generates the smoothed image 133 by synthesizing the level values of the level value limit smoothed images 132b-1 through 132b-n being selected and enlarged. The enlargement/synthesis processing unit 1124b stores the generated smoothed image 133 in the storage unit 13.

An operation performed by the image processing device 1b according to the fourth embodiment of the present invention will be described with reference to a flowchart in FIG. 11, and FIGS. 10, 12, and 13. Detailed description of the same operations as those in the first and the second embodiments will be omitted.

Figure 12:
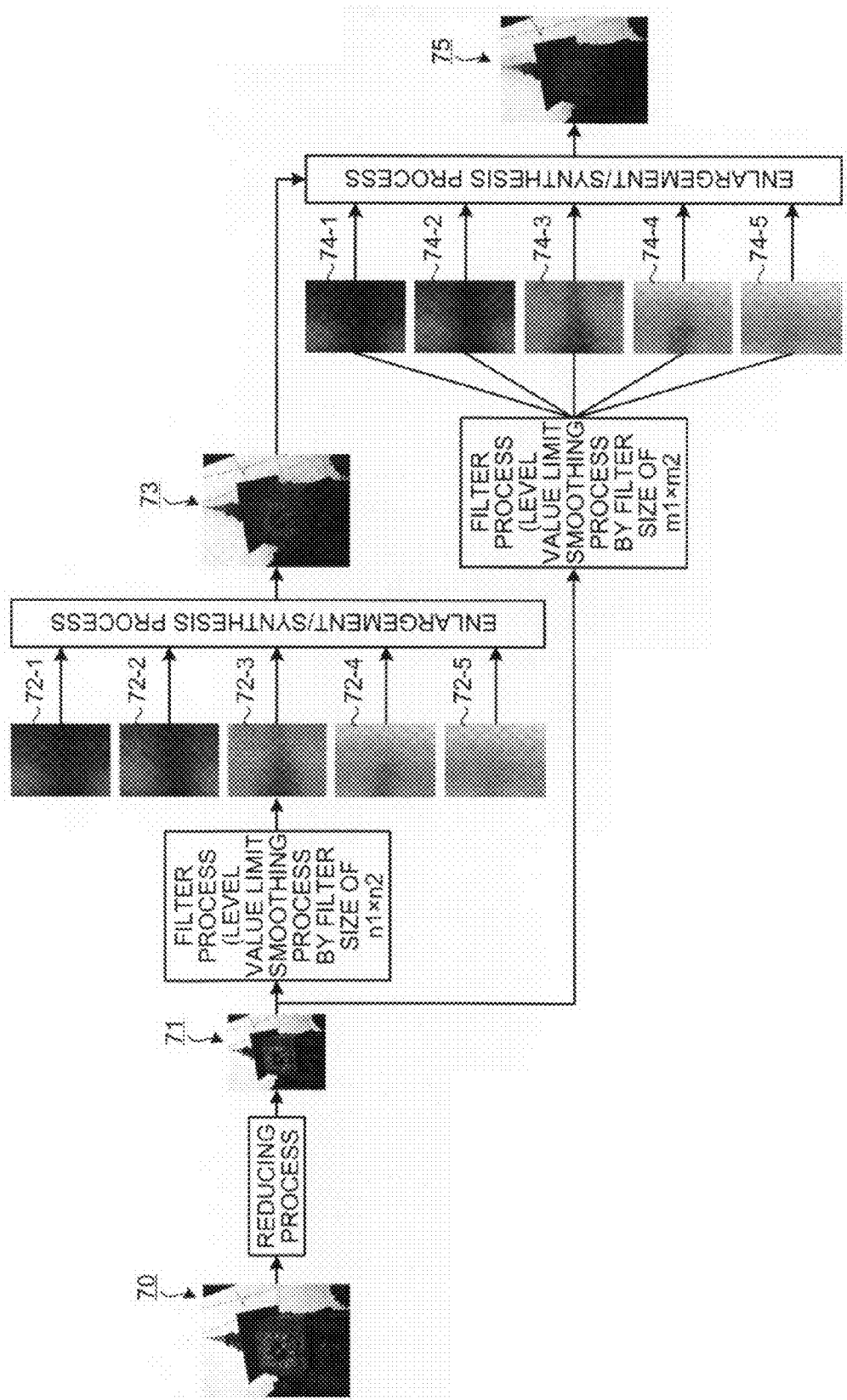
FIG. 12 is a schematic for explaining an operation performed by the image processing device according to the fourth embodiment.

The input-image receiving unit 111 reads the input image 2 of one frame and stores the image in the storage unit 13 as the input image 131 (Step S300). In FIG. 12, the input-image receiving unit 111 reads an input image 70. The reduced-image generating unit 1123 generates the reduced image 134 by reducing (the number of pixels is reduced from) the input image 131, by taking out pixels therefrom (Step S301). In FIG. 12, a reduced image 71 is generated from the input image 70.

The filter processing unit 1120a generates the level value limit smoothed images 132a-1 through 132a-n, by carrying out the level value limit smoothing process that accumulates and averages the pixels in the reduced image 134 that fall within the range of level values specified in a predetermined filter size (Step S302). The average value may be calculated, by calculating a weighted average value based on the distance from the center of the filter, so as to increase the weight of the pixels in the center of the filter and decrease the weight of the pixels at both ends of the filter.

More specifically, the LPFs 1121a-1 through 1121a-n of the filter processing unit 1120a, in the one-dimensional filter process performed on an image in the horizontal direction, if there is a level value of pixels whose level value of the pixels in the reduced image 134 in the filter size falls within the range of level values set therein, accumulate therein the level values and calculate the average value thereof. The LPFs 1121a-1 through 1121a-n of the filter processing unit 1120a, if there is no level value of pixels whose level value of the pixels in the reduced image 134 in the filter size fall within the range of level values set therein, accumulate therein the level values of all the pixels in the filter size, and calculate the average value thereof. Then, with respect to the image to which the filter process is performed on all the pixels in the horizontal direction, the one-dimensional filter process is similarly performed in the vertical direction. The LPFs 1121a-1 through 1121a-n generate the level value limit smoothed images 132a-1 through 132a-n with respect to the reduced image 134 using the calculated average value as the level value of the pixel of interest. The LPFs 1121a-1 through 1121a-n store the generated level value limit smoothed images 132a-1 through 132a-n in the storage unit 13. The average value may be calculated by performing weighting as described in the third embodiment. The one-dimensional filter process may be performed in the vertical direction first, and may be carried out by two-dimensional filter.

When the number of pixels whose level value of the pixels in the reduced image 134 in the filter size falls within the range of level values set therein, is less than the predetermined threshold, it is possible to accumulate the level values of all the pixels and calculate the average value thereof. It is also possible to output the center level value, instead of accumulating the level values of all the pixels and calculating the average value thereof.

In FIG. 12, n=5, in other words, five LPFs 1121a-1 through 1121a-5 having a filter size of n1×n2 generate level value limit smoothed images 72-1 through 72-5, by carrying out the level value limit smoothing process with respect to the reduced image 71, within the range of level values being set respectively.

The enlargement/synthesis processing unit 1124a, based on the input image 131 stored in the storage unit 13, generates the reference image 135 by interpolating (enlarging) and synthesizing the level value limit smoothed images 132a-1 through 132a-n, using the 3D-interpolation described in the second embodiment (Step S303). In FIG. 12, a reference image 73 is generated from the level value limit smoothed images 72-1 through 72-5 based on the input image 70.

The filter processing unit 1120b generates the level value limit smoothed images 132b-1 through 132b-n by carrying out the level value limit smoothing process that accumulates and averages the pixels in the reduced image 134 that fall within the range of level values specified in a predetermined filter size (Step S304).

More specifically, the LPFs 1121b-1 through 1121b-n in the filter processing unit 1120b, in the one-dimensional filter process performed on an image in the horizontal direction, if there is a level value of pixel whose level value of the pixels in the reduced image 134 in the filter size falls within the range of level values set therein, accumulate therein the level values and calculate the average value thereof. The LPFs 1121b-1 through 1121b-n in the filter processing unit 1120b, if there is no level value of pixels whose level value of the pixels in the reduced image 134 in the filter size falls within the range of level values set therein, accumulate therein the level values of all the pixels in the filter size and calculate the average value thereof. Then, with respect to the image to which the filter process is performed on all the pixels in the horizontal direction, the one-dimensional filter process is similarly performed in the vertical direction. The LPFs 1121*b*-1 through 1121*b-n* generate the level value limit smoothed images 132*b*-1 through 132*b-n* with respect to the reduced image 134, using the calculated average value as the level value of the pixel of interest. The LPFs 1121*b*-1 through 1121*b-n* store the generated level value limit smoothed images 132*b*-1 through 132*b-n* in the storage unit 13. The average value may be calculated by performing weighting, as described in the third embodiment. The one-dimensional filter process may be performed in the vertical direction first, and may be carried out by two-dimensional filter.

When the number of pixels whose level value of the pixels in the reduced image 134 in the filter size falls within the range of level values set therein, is less than the predetermined threshold, it is possible to accumulate the level values of all the pixels and calculate the average value thereof. It is also possible to output the center level value, instead of accumulating the level values of all the pixels and calculating the average value thereof.

In FIG. 12, n=5, in other words, five LPFs 1121*b*-1 through 1121*b*-5 having a filter size of m1×m2 generate level value limit smoothed images 74-1 through 74-5, by carrying out the level value limit smoothing process with respect to the reduced image 71 within the range of level values being set respectively.

The enlargement/synthesis processing unit 1124*b*, based on the reference image 135 stored in the storage unit 13, generates the smoothed image 133 by interpolating (enlarging) and synthesizing the level value limit smoothed images 132*b*-1 through 132*b-n*, using the 3D-interpolation described in the second embodiment (Step S305). In FIG. 12, a smoothed image 75 is generated from the level value limit smoothed images 74-1 through 74-5, based on the reference image 73.

The output-image generating unit 113 generates and outputs the output image 3 in which the level value of the smoothed image 133 is emphasized, based on the input image 131 and the smoothed image 133 (Step S306).

Figure 13:
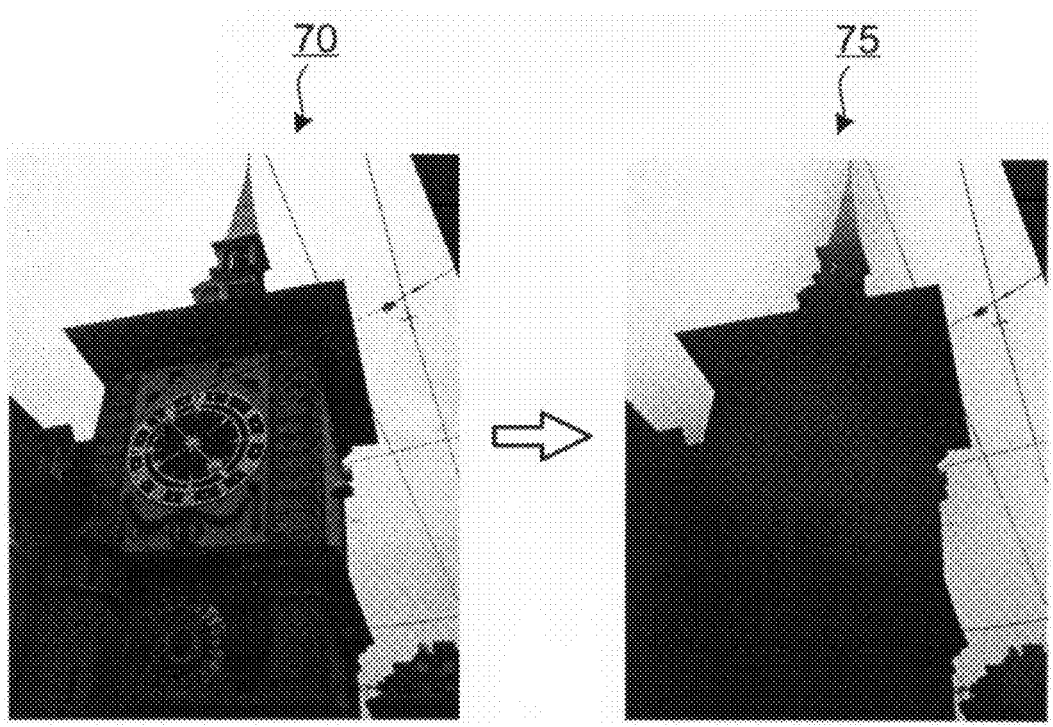
FIG. 13 is a schematic for explaining an operation performed by the image processing device according to the fourth embodiment.

In FIG. 13, the input image 70 and the smoothed image 75 of the image processing device 1*b* are depicted. As depicted in FIG. 13, the microstructure of the region e2 in the smoothed image 61 depicted in FIG. 9 is eliminated from the smoothed image 75 of the image processing device 1*b*.

In this manner, in the fourth embodiment, the LPFs 1121*b* through 1121*b-n* that are a plurality of second low pass filters having a different filter size from that of the LPFs 1121*a*-1 through 1121-*n*, which is the plurality of first low pass filters, and respectively set with different ranges of level values. The LPFs 1121*b* through 1121*b-n* use each pixel in the reduced image 134 that is a first input image formed by reducing the input image 131 as a pixel of interest, and extract a pixel whose level value of pixels including the pixel of interest in the filter size falls within the range of level values set therein. The LPFs 1121*b* through 1121*b-n* also generate level value limit smoothed images 132*b*-1 through 132*b-n* that are second level value limit smoothed images by smoothing the level values of extracted pixels to be used as a level value of the pixel of interest. The enlargement/synthesis processing unit 1124*b* that is a second synthesis processing unit uses pixels in the reference image 135 that is a first smoothed image generated from the level value limit smoothed images 132*a*-1 through 132-*n*, which are the first level value limit smoothed images generated by the LPFs 1121*a*-1 through 1121*a-n*, as a processing object pixel. The enlargement/synthesis processing unit 1124*b* selects one or a plurality of level value limit smoothed images 132*b*-1 through 132*b-n* generated by the LPFs 1121*b*-1 through 1121*b-n* set with the range of level values including the level value of the processing object pixel. The enlargement/synthesis processing unit 1124*b* also generates the smoothed image 133 that uses a value calculated from a level value of one or a plurality of pixels at the position of the processing object pixel or in the vicinity thereof in the selected level value limit smoothed images 132*b*-1 through 132*b-n*, as the level value of the processing object pixel. In other words, by performing the processes having the same structure with different filter sizes for a plurality of times, the microstructure of the input image can be eliminated. Accordingly, it is possible to quickly generate a smoothed image in which the edge of the input image is accurately maintained and the portion other than the edge is blurred. In the fourth embodiment, the process is repeated twice, but it may be repeated equal to or more than three times.

In the fourth embodiment, interpolation and synthesis are performed by using the 3D-interpolation described in the second embodiment. However, it is also possible to enlarge all the level value limit smoothed images 132*a*-1 through 132*a-n* and the level value limit smoothed images 132*b*-1 through 132*b-n* first, using a bilinear method and the like, and synthesizing the level values afterwards. The synthesizing may be performed, by calculating a weighted average value of the level values of the selected level value limit smoothed images, based on the difference between the center value of the range of level values and the level value of the processing object pixel.

In the fourth embodiment, the reference image 135 and the smoothed image 133 are generated, by generating, interpolating, and synthesizing the level value limit smoothed images 132*a*-1 through 132*a-n* and the level value limit smoothed images 132*b*-1 through 132*b-n* using the reduced image 134 formed by reducing the input image 131. However, it is possible to generate the reference image 135 and the smoothed image 133 by generating and synthesizing the level value limit smoothed images 132*a*-1 through 132*a-n* and the level value limit smoothed images 132*b*-1 through 132*b-n* using the input image 131, instead of entering the reduced image into the filter processing units 1120*a* and 1120*b*.

The functions realized by the input-image receiving unit 111, the reduced-image generating unit 1123, the LPFs 1121*a*-1 through 1121*a-n* and 1121*b*-1 through 1121*b-n*, the enlargement/synthesis processing units 1124*a* and 1124*b*, and the output-image generating unit 113 of the fourth embodiment may be provided as an image processing program that enables a general-purpose computer to realize the functions. In this case, the image processing program is recorded and provided in a computer-readable recording medium such as a ROM, a CD-ROM, a floppy (trademark) disk, and a DVD, in a file in a form that can be installed in a computer, or in a form that can be executed by a computer. The image processing program recorded in the recording medium is read from the recording medium, and realized on the computer.

[e] Fifth Embodiment

Figure 14:
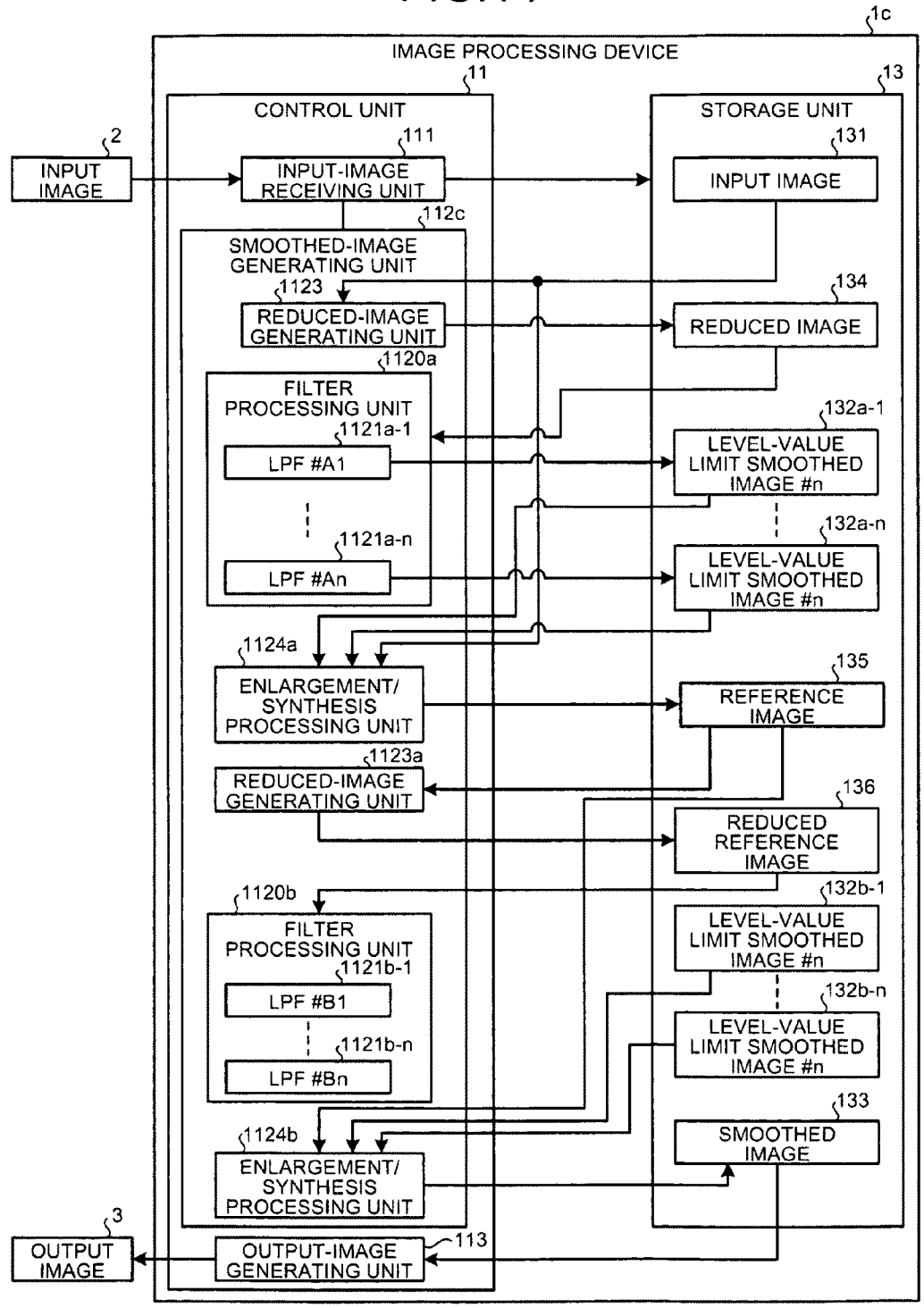
FIG. 14 is a block diagram of an image processing device according to a fifth embodiment.
Figure 15:
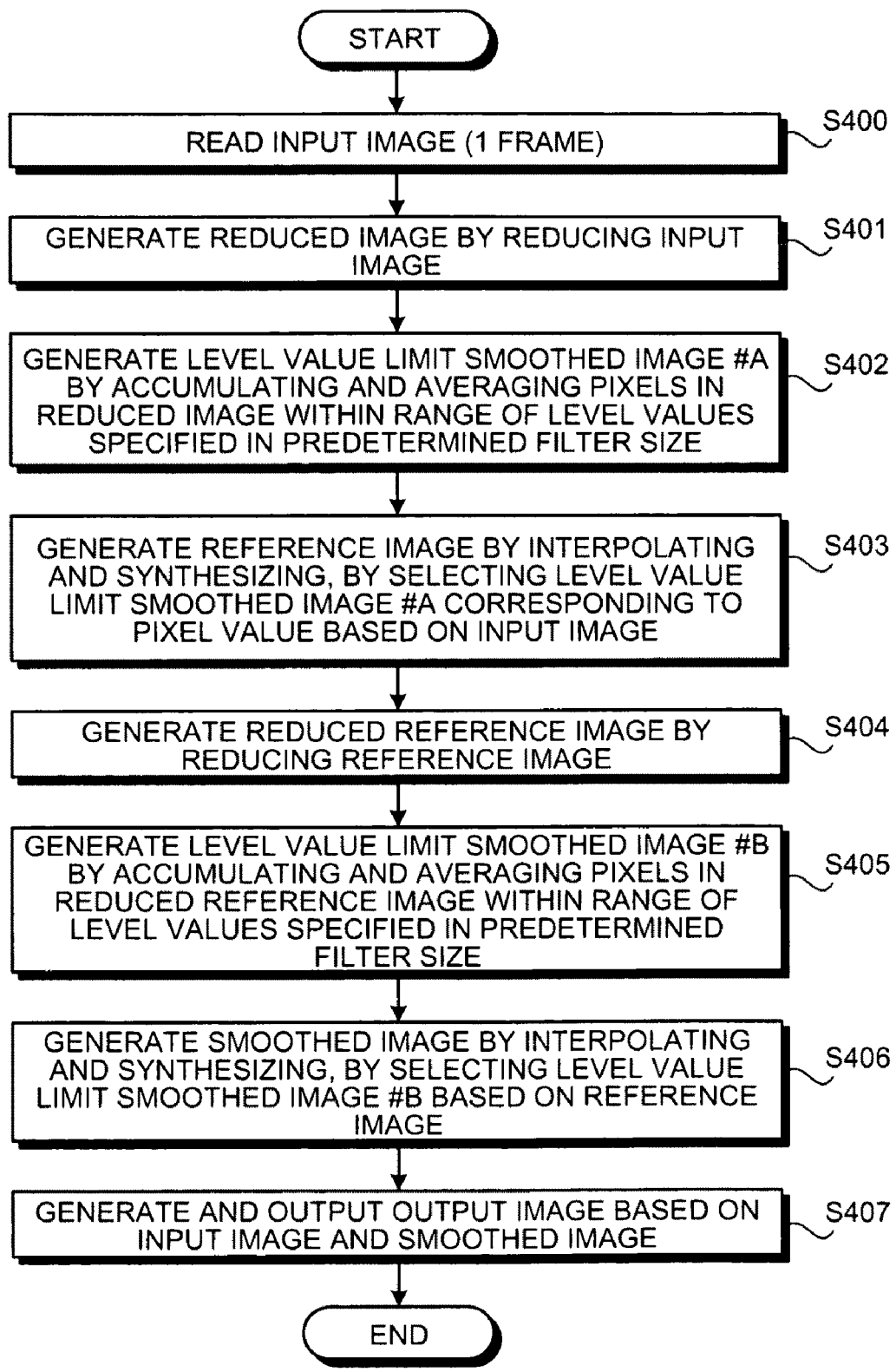
FIG. 15 is a flowchart for explaining an operation performed by the image processing device according to the fifth embodiment.

A fifth embodiment of the present invention will be described with reference to FIGS. 14 to 16. FIG. 14 is a block diagram of an image processing device 1*c* according to the fifth embodiment of the present invention. The image processing device 1*c* depicted in FIG. 14 includes a smoothed-image generating unit 112*c* that a reduced-image generating unit 1123*a* is added to the smoothed-image generating unit 112*b*, instead of the smoothed-image generating unit 112*b* of the image processing device 1*b* according to the fourth embodiment depicted in FIG. 10. The elements having the same functions as those in the image processing device 1*b* according to the fourth embodiment depicted in FIG. 10 are denoted by the same reference numerals, and the descriptions thereof will be omitted.

The reduced-image generating unit 1123*a* generates a reduced reference image 136 formed by reducing (the number of pixels is reduced from) the reference image 135, by taking out pixels in the reference image 135 stored in the storage unit 13, and stores the image in the storage unit 13. The reference image 135 is reduced, by using the same reduction ratio used when the reduced-image generating unit 1123 reduces the input image 131.

The LPFs 1121*b*-1 through 1121*b*-*n* of the filter processing unit 1120*b* carry out the level value limit smoothing process with respect to the reduced reference image 136.

An operation performed by the image processing device 1c according to the fifth embodiment of the present invention will be described with reference to a flowchart in FIG. 15, and FIGS. 14 and 16. Detailed description of the same operations as those in the fourth embodiment will be omitted.

The input-image receiving unit 111 reads the input image 2 of one frame and stores the image in the storage unit 13 as the input image 131 (Step S400). In FIG. 16, the input-image receiving unit 111 reads an input image 80. The reduced-image generating unit 1123 generates the reduced image 134 by reducing (the number of pixels is reduced from) the input image 131, by taking out pixels therefrom (Step S401). In FIG. 16, a reduced image 81 is generated from the input image 80.

The filter processing unit 1120*a* generates the level value limit smoothed images 132*a*-1 through 132*a*-*n* by carrying out the level value limit smoothing process that accumulates and averages the pixels that fall within the range of level values specified in a predetermined filter size (Step S402).

Figure 16:
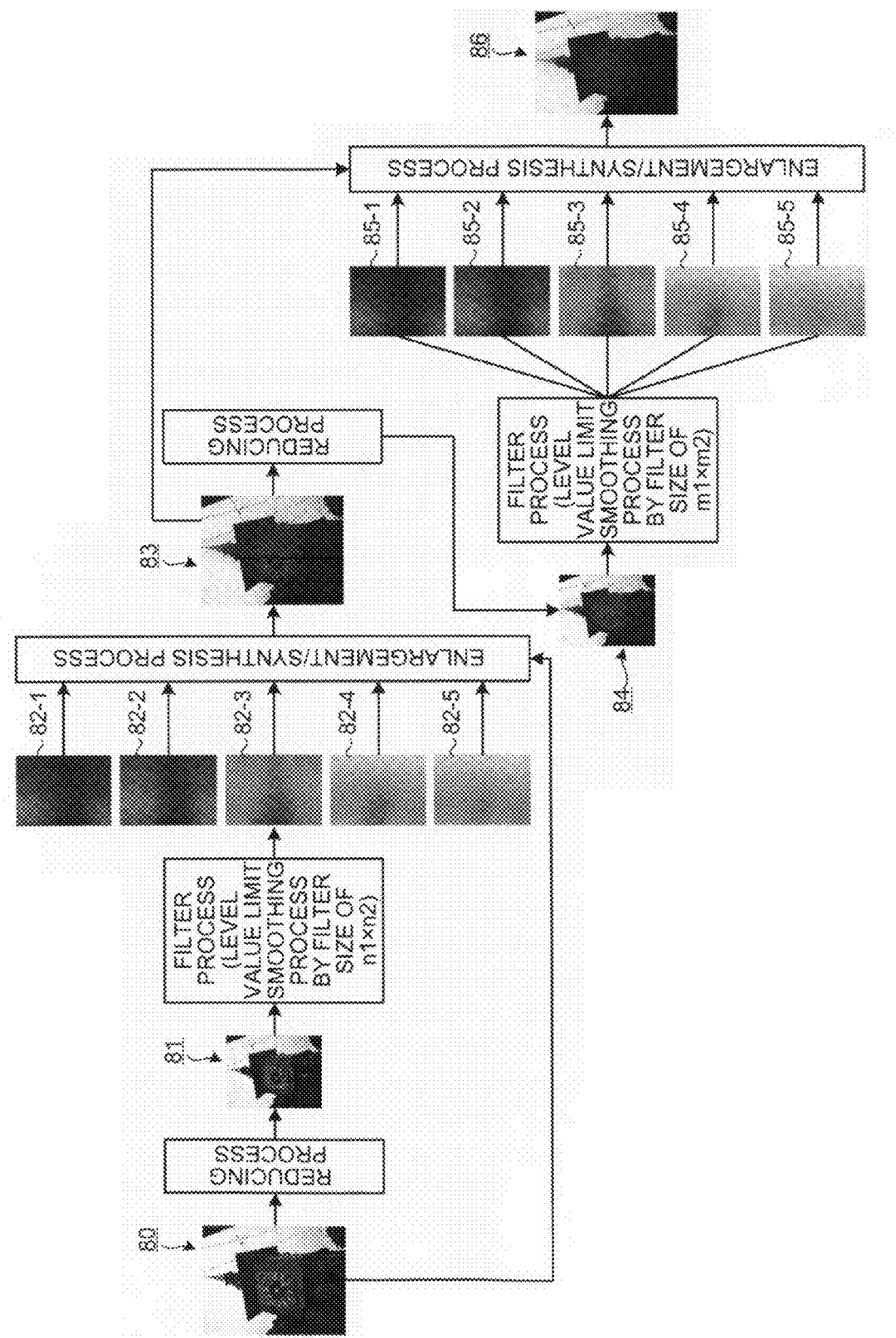
FIG. 16 is a schematic for explaining an operation performed by the image processing device according to the fifth embodiment.
Figure 17:
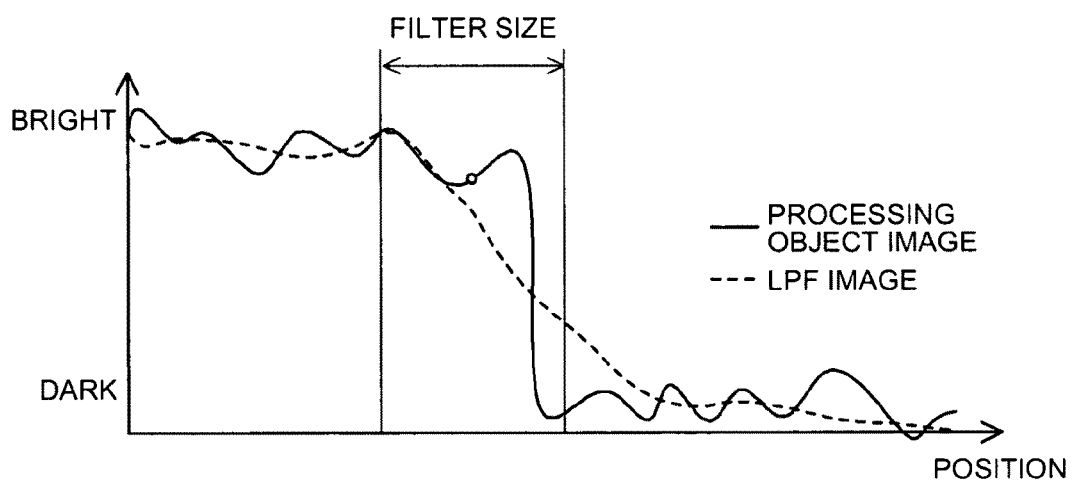
FIG. 17 is a schematic for explaining a conventional technology.
Figure 18:
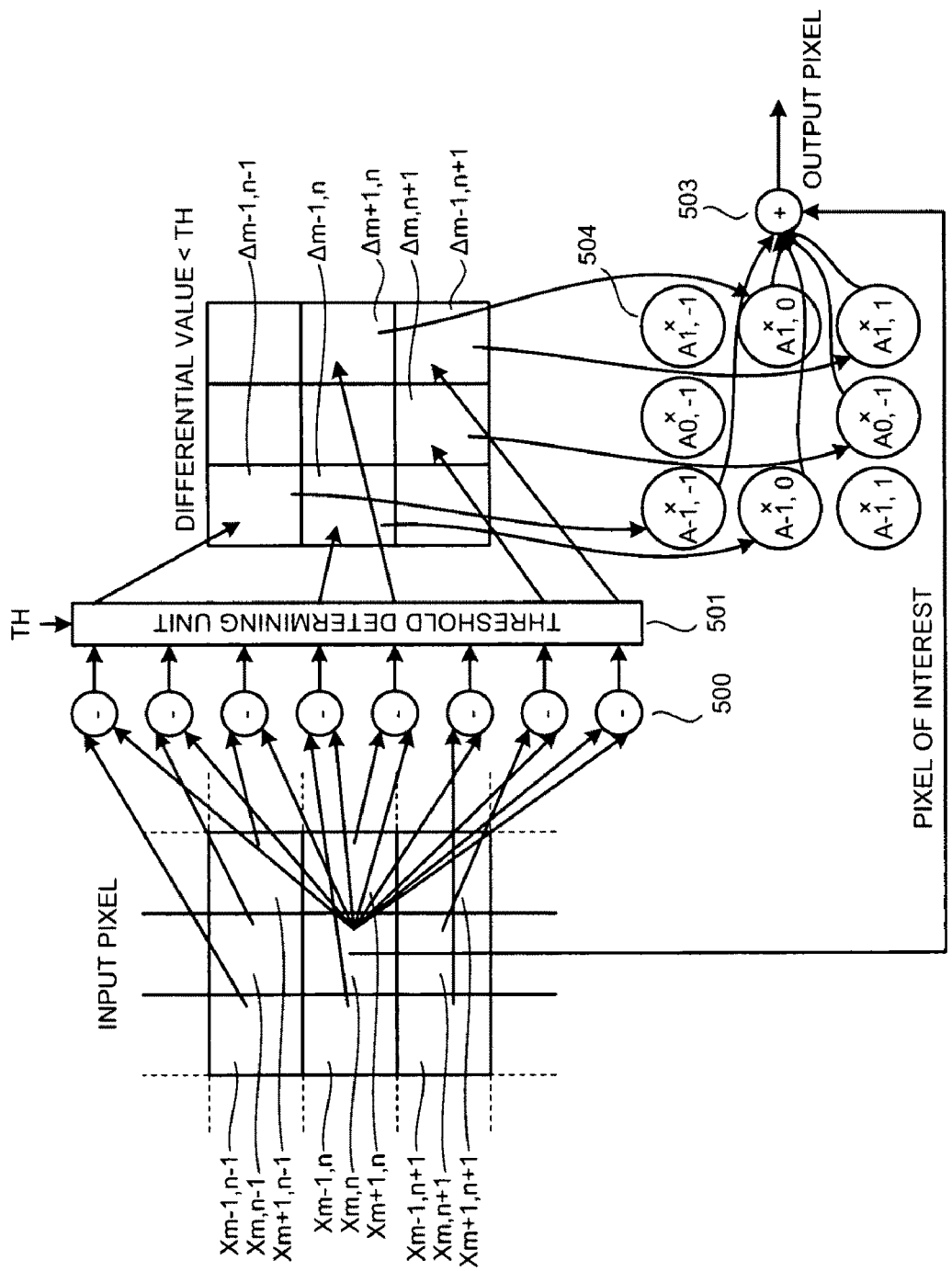
FIG. 18 is a schematic for explaining a conventional technology.
Figure 19:
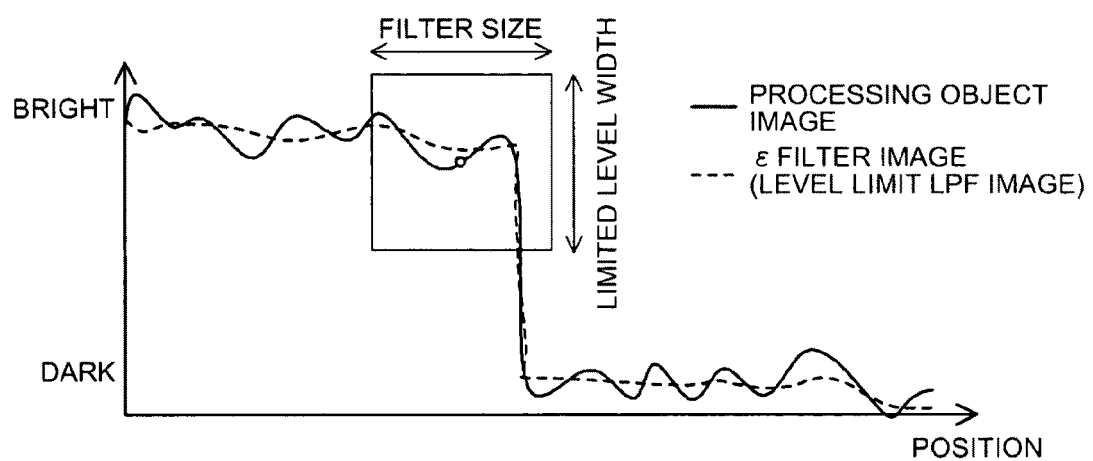
FIG. 19 is a schematic for explaining a conventional technology.
Figure 20:
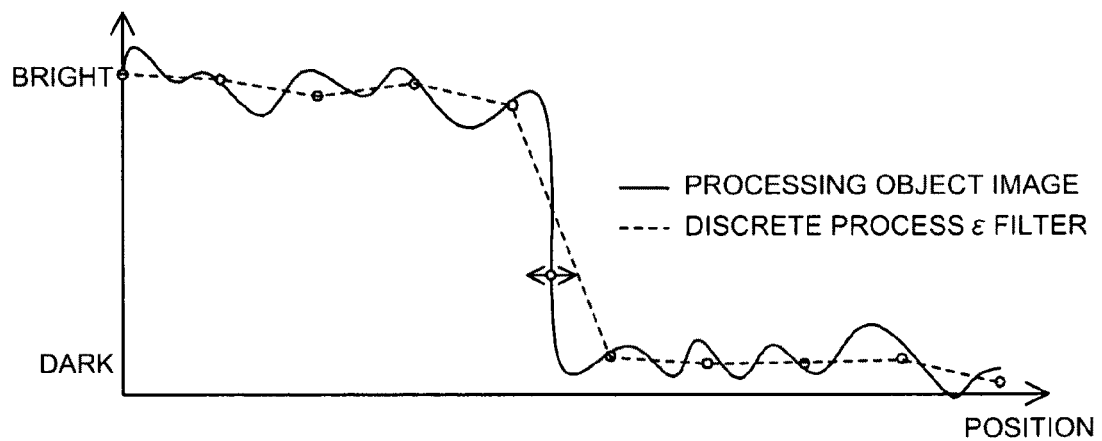
FIG. 20 is a schematic for explaining a negative effect on increasing speed by lowering resolution in the conventional technology.
Figure 21:
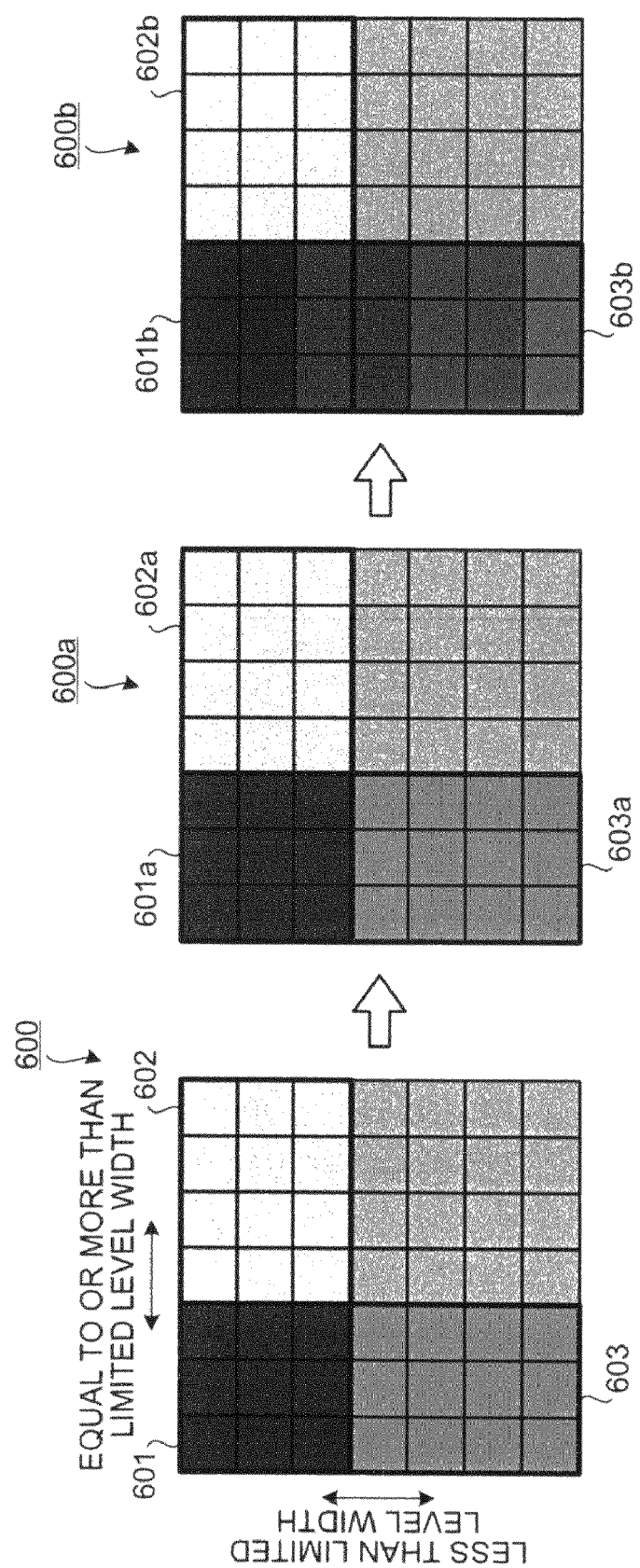
FIG. 21 is a schematic for explaining an artifact produced by horizontal and vertical processes.

In FIG. 16, n=5, in other words, five LPFs 1121*a*-1 through 1121*a*-5 having the filter size of n1×n2 generate level value limit smoothed images 82-1 through 82-5, by carrying out the level value limit smoothing process with respect to the reduced image 81 within the range of level values being set respectively.

The enlargement/synthesis processing unit 1124*a*, based on the input image 131 stored in the storage unit 13, generates the reference image 135 by interpolating (enlarging) and synthesizing the level value limit smoothed images 132*a*-1 through 132*a*-*n*, using the 3D-interpolation described in the second embodiment (Step S403). In FIG. 16, a reference image 83 is generated from the level value limit smoothed images 82-1 through 82-5 based on the input image 80.

The reduced-image generating unit 1123*a* generates the reduced reference image 136 by reducing (the number of pixels is reduced from) the reference image 135, by taking out pixels therefrom (Step S404). In FIG. 16, a reduced reference image 84 is generated from the reference image 83.

The filter processing unit 1120*b* generates the level value limit smoothed images 132*b*-1 through 132*b*-*n*, by carrying out the level value limit smoothing process that accumulates and averages the pixels in the reduced reference image 136 that fall within the range of level values specified in a predetermined filter size (Step S405).

In FIG. 16, n=5, in other words, five LPFs 1121*b*-1 through 1121*b*-5 having the filter size of m1×m2, generate the level value limit smoothed images 85-1 through 85-5, by carrying out the level value limit smoothing process with respect to the reduced reference image 84 within the range of level values being set respectively.

The enlargement/synthesis processing unit 1124*b*, based on the reference image 135 stored in the storage unit 13, generates the smoothed image 133 by interpolating (enlarging) and synthesizing the level value limit smoothed images 132*b*-1 through 132*b*-*n*, using the 3D-interpolation described in the second embodiment (Step S406). In FIG. 16, a smoothed image 86 is generated from the level value limit smoothed images 85-1 through 85-5, based on the reference image 83.

The output-image generating unit 113 generates and outputs the output image 3 in which the level value of the smoothed image 133 is emphasized, based on the input image 131 and the smoothed image 133 (Step S407).

In this manner, in the fifth embodiment, the LPFs 1121*b*-1 through 1121*b*-*n* are a plurality of second low pass filters respectively set with different ranges of level values having the filter size different from that of the LPFs 1121*a*-1 through 1121*a*-*n*, which are the plurality of first low pass filters. The LPFs 1121*b*-1 through 1121*b*-*n* use a pixel in the reduced reference image 136 that is a second smoothed image formed by reducing the reference image 135 generated from the level value limit smoothed images 132*a*-1 through 132*a*-*n* generated by the LPFs 1121*a*-1 through 1121-*n*, as a pixel of interest. The LPFs 1121*b*-1 through 1121*b*-*n* extract a pixel whose level value of pixels including the pixel of interest in the filter size falls within the range of level values set therein, and generates the level value limit smoothed images 132*b*-1 through 132*b*-*n* that are second level value limit smoothed images by smoothing the level values of the extracted pixels to be used as a level value of the pixel of interest. The enlargement/synthesis processing unit 1124, which is a second synthesis processing unit, sequentially processes each pixel in the reference image 135 as a processing object pixel, and selects the level value limit smoothed images 132*b*-1 through 132*b*-*n* generated by the LPF 1121*b*-1 through 1121*b*-*n* set with the range of level values including the level value of the processing object pixel. The enlargement/synthesis processing unit 1124 generates the smoothed image 133 that uses a value calculated from a level value of the pixel that corresponds to the position of the processing object pixel in the selected level value limit smoothed images 132*b*-1 through 132*b*-*n* as a level value of the processing object pixel. In other words, while performing the processes having the same structure with different filter sizes for a plurality of times, the reduced reference image 136 formed by reducing the reduced image 135 that is the smoothed image generated in a prior stage is also used in a subsequent stage. Accordingly, compared with when the reduced image 134 formed by reducing the input image 131 is used in the subsequent stage, it is possible to more accurately and quickly generate a smoothed image in which the edge of the input image is accurately maintained and a portion other than the edge is blurred, without leaving a microstructure of the input image.

In the fifth embodiment, interpolation and synthesis are performed using the 3D-interpolation described in the second embodiment. However, it is also possible to enlarge all the level value limit smoothed images 132*a*-1 through 132*a*-*n* and the level value limit smoothed images 132*b*-1 through 132*b*-*n* first, using a bilinear method and the like, and synthesizing the level values afterwards. The synthesizing may be performed, by calculating a weighted average value of the level values of the selected level value limit smoothed images, based on the difference between the center value of the range of level values and the level value of the processing object pixel.

In the fifth embodiment, the smoothed image 133 is generated by generating the level value limit smoothed images 132*a*-1 through 132*a*-*n* by using the reduced image 134 formed by reducing the input image 131, generating the level value limit smoothed images 132b-1 through 132b-n by using the reduced reference image 136 formed by reducing the reference image 135 obtained by interpolating and synthesizing the level value limit smoothed images 132a-1 through 132a-n, and interpolating and synthesizing the images. However, it is also possible to generate the smoothed image 133 by generating the reference image 135 by generating and synthesizing the level value limit smoothed images 132a-1 through 132a-n using the input image 131, and generating and synthesizing the level value limit smoothed images 132b-1 through 132b-n using the reference image 135, instead of entering the reduced image into the filter processing units 1120a and 1120b.

The functions realized by the input-image receiving unit 111, the reduced-image generating units 1123 and 1123a, the LPFs 1121a-1 through 1121a-n and the 1121b-1 through 1121b-n, the enlargement/synthesis processing units 1124a and 1124b, and the output-image generating unit 113 of the fifth embodiment may be provided as an image processing program that enables a general-purpose computer to realize the functions. In this case, the image processing program is recorded and provided in a computer-readable recording medium such as a ROM, a CD-ROM, a floppy (trademark) disk, and a DVD, in a file in a form that can be installed in a computer, or in a form that can be executed by a computer. The image processing program recorded in the recording medium is read from the recording medium, and realized on the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing device for generating a smoothed image with an input image blurred, the image processing device comprising:
   a plurality of first low pass filters each set with a different range of level value, using each pixel in the input image or a first input image generated based on the input image as a pixel of interest,
   configured to:
      extract each pixel that has a level value of each pixel including the pixel of interest in a filter size within a range of level value set therein, and
      generate a first level value limit smoothed image by smoothing a level value of an extracted pixel to be used as a level value of the pixel of interest; and
   a first synthesis processing unit that uses each pixel in the input image or a second input image generated based on the input image as a processing object pixel,
   configured to:
      select one or a plurality of first level value limit smoothed images generated by the first low pass filter set with a range of level value including a level value of the processing object pixel, and
      generate a smoothed image that uses a value calculated from a level value of one or a plurality of pixels at a position of the processing object pixel or in a vicinity thereof in the first level value limit smoothed image selected, as the level value of the processing object pixel.

2. The image processing device according to claim 1, wherein
   the first input image is a reduced image of the input image, and
   the first synthesis processing unit enlarges the first level value limit smoothed image generated from the first input image based on the input image, and selects one or a plurality of first level value limit smoothed images enlarged.

3. The image processing device according to claim 1, wherein the first synthesis processing unit generates the first level value limit smoothed image by interpolating the level value using 3-D interpolation, by using a level value and positional information of a pixel in the first level value limit smoothed image.

4. The image processing device according to claim 1, wherein the first synthesis processing unit generates the smoothed image by weight averaging the level value of a pixel in the first level value limit smoothed image.

5. The image processing device according to claim 1, wherein the first low pass filter is a one-dimensional low pass filter, and performs smoothing by sequentially performing a horizontal direction smoothing process and a vertical direction smoothing process.

6. The image processing device according to claim 1, wherein the plurality of first low pass filters, in the range of level value set therein, calculate an average value by increasing weight as moving closer to a center value from a lower limit value and an upper limit value.

7. The image processing device according to claim 1, wherein the plurality of first low pass filters, if a level value within the range of level value set therein is not included in the level value of each pixel including the pixel of interest in the filter size, or if a number thereof is less than a predetermined threshold, calculate an average value by extracting all pixels including the pixel of interest in the filter size.

8. The image processing device according to claim 1, wherein the plurality of first low pass filters, if a level value within the range of level value set therein is not included in the level value of each pixel including the pixel of interest in the filter size, or if a number thereof is less than a predetermined threshold, output a predetermined value within the range of level value.

9. The image processing device according to claim 8, wherein the predetermined value within the range of level value is a center value in the range of level value.

10. The image processing device according to claim 1, further comprising:
   a plurality of second low pass filters having a filter size different from that of the plurality of first low pass filters, and each set with a different range of level value, using a pixel in the input image or the first input image as a pixel of interest,
   configured to:
      extract each pixel that has a level value of each pixel including the pixel of interest in the filter size within the range of level value set therein, and
      generate a second level value limit smoothed image by smoothing a level value of an extracted pixel to be used as a level value of the pixel of interest; and
   a second synthesis processing unit that uses each pixel in a first smoothed image generated by the first synthesis processing unit as a processing object pixel, configured to:
: select one or a plurality of second level value limit smoothed images generated by the second low pass filter set with a range of level value including a level value of the processing object pixel, and
: generate a smoothed image that uses a value calculated from a level value of one or a plurality of pixels at a position of the processing object pixel or in a vicinity thereof, in the second level value limit smoothed image selected, as the level value of the processing object pixel.

11. The image processing device according to claim 10, wherein
the first input image is a reduced image of the input image,
the first synthesis processing unit enlarges the first level value limit smoothed image generated from the first input image based on the input image, and selects one or a plurality of first level value limit smoothed images enlarged, and
the second synthesis processing unit enlarges the second level value limit smoothed image generated from the first input image based on the smoothed image generated by the first synthesis processing unit, and selects one or a plurality of second level value limit smoothed images enlarged.

12. The image processing device according to claim 1, further comprising:
a plurality of second low pass filters having a filter size different from that of the plurality of first low pass filters, using each pixel in a first smoothed image generated by the first synthesis processing unit or in a second smoothed image generated based on the first smoothed image as a pixel of interest,
configured to:
: extract each pixel that has a level value of each pixel including the pixel of interest in the filter size within the range of level value set therein, and
: generate a second level value limit smoothed image by smoothing a level value of an extracted pixel to be used as a level value of the pixel of interest; and
a second synthesis processing unit that uses each pixel in the first smoothed image generated by the first synthesis processing unit as a processing object pixel,
configured to:
: select one or a plurality of second level value limit smoothed images generated by the second low pass filter set with a range of level value including a level value of the processing object pixel, and
: generate a smoothed image that uses a value calculated from a level value of one or a plurality of pixels positioned at the processing object pixel or in a vicinity thereof, in the second level value limit smoothed image selected, as the level value of the processing object pixel.

13. The image processing device according to claim 12, wherein
the first input image is a reduced image of the input image,
the first synthesis processing unit enlarges the first level value limit smoothed image generated from the first input image based on the input image, and selects one or a plurality of first level value limit smoothed images enlarged,
the second smoothed image is a reduced image of the first smoothed image, and
the second synthesis processing unit enlarges the second level value limit smoothed image generated from the second smoothed image based on the first smoothed image generated by the first synthesis processing unit, and selects one or a plurality of second level value limit smoothed images enlarged.

14. A non-transitory computer readable storage medium containing instructions for generating a smoothed image with an input image blurred, wherein the instructions, when executed by a computer, cause the computer to perform:
in a plurality of first low pass filters each set with a different range of level value, using each pixel in the input image or a first input image generated based on the input image as a pixel of interest,
configured to:
: extract each pixel that has a level value of each pixel including the pixel of interest in a filter size within a range of level value set therein, and
: generate a first level value limit smoothed image by smoothing a level value of an extracted pixel to be used as a level value of the pixel of interest; and
using each pixel in the input image or a second input image generated based on the input image as a processing object pixel,
configured to:
: select one or a plurality of first level value limit smoothed images generated in the first low pass filter set with a range of level value including a level value of the processing object pixel, and
: generate a smoothed image that uses a value calculated from a level value of one or a plurality of pixels at a position of the processing object pixel or in a vicinity thereof in the first level value limit smoothed image selected, as the level value of the processing object pixel.

15. An image processing method for generating a smoothed image with an input image blurred, the image processing method comprising:
in a plurality of first low pass filters each set with a different range of level value, using each pixel in the input image or a first input image generated based on the input image as a pixel of interest,
configured to:
: extract each pixel that has a level value of each pixel including the pixel of interest in a filter size within a range of level value set therein, and
: generate a first level value limit smoothed image by smoothing a level value of an extracted pixel to be used as a level value of the pixel of interest; and
using each pixel in the input image or a second input image generated based on the input image as a processing object pixel,
configured to:
: select one or a plurality of first level value limit smoothed images generated in the first low pass filter set with a range of level value including a level value of the processing object pixel, and
: generate a smoothed image that uses a value calculated from a level value of one or a plurality of pixels at a position of the processing object pixel or in a vicinity thereof in the first level value limit smoothed image selected, as the level value of the processing object pixel.

* * * * *